(12) United States Patent
DiDomenico, III et al.

(10) Patent No.: US 9,405,804 B1
(45) Date of Patent: Aug. 2, 2016

(54) IDENTIFICATION OF SUBGROUP INTERESTS

(71) Applicant: MicroStrategy Incorporated, Vienna, VA (US)

(72) Inventors: Peter Jerome DiDomenico, III, Vienna, VA (US); Javier Aldrete, Austin, TX (US); Peng Xiao, McLean, VA (US); David Glenn Norris, Washington, DC (US)

(73) Assignee: MicroStrategy Incorporated, Vienna, VA (US)

( * ) Notice: Subject to any disclaimer, the term of this patent is extended or adjusted under 35 U.S.C. 154(b) by 448 days.

(21) Appl. No.: 13/890,364

(22) Filed: May 9, 2013

Related U.S. Application Data

(60) Provisional application No. 61/668,692, filed on Jul. 6, 2012.

(51) Int. Cl.
*G06F 17/30* (2006.01)
(52) U.S. Cl.
CPC .................................. *G06F 17/3053* (2013.01)
(58) Field of Classification Search
None
See application file for complete search history.

(56) References Cited

U.S. PATENT DOCUMENTS

| | | | |
|---|---|---|---|
| 8,332,512 B1 * | 12/2012 | Wu et al. ....................... 709/224 |
| 8,725,858 B1 | 5/2014 | Wu et al. | |
| 8,782,157 B1 * | 7/2014 | Hansen ......................... 709/206 |
| 2009/0198566 A1 * | 8/2009 | Greenberg ..................... 705/10 |
| 2009/0248607 A1 | 10/2009 | Eggink et al. | |
| 2012/0001919 A1 * | 1/2012 | Lumer .............. G06F 17/30705 345/440 |
| 2013/0097142 A1 * | 4/2013 | Kim ....................... G06Q 30/02 707/706 |
| 2014/0032708 A1 * | 1/2014 | Zamir et al. ................... 709/217 |
| 2014/0122220 A1 * | 5/2014 | Bradley et al. ............. 705/14.42 |
| 2014/0289611 A1 * | 9/2014 | Norwood et al. ............ 715/234 |
| 2014/0324543 A1 * | 10/2014 | Heller et al. ................. 705/7.33 |
| 2014/0351026 A1 * | 11/2014 | Merel ............................. 705/12 |

FOREIGN PATENT DOCUMENTS

EP           2107761         10/2009

* cited by examiner

*Primary Examiner* — Debbie Le
(74) *Attorney, Agent, or Firm* — Fish & Richardson P.C.

(57) ABSTRACT

This specification describes technologies relating to identification of interests of a subgroup of a larger group of users. One aspect of the subject matter described in this specification can be embodied in methods that include receiving data reflecting characteristics for users in a set of users of a social networking platform, wherein the data reflects endorsements of pages hosted on the social networking platform. A subset of the users within the set is identified by excluding users in the set with characteristics that do not match filter criteria. For each of some of the pages endorsed by members of the subset, a measure of the likelihood of a user in the subset endorsing the page relative to the likelihood of other users in the set endorsing the page is calculated. One or more content items are selected based on the measures and data specifying the selected content items is transmitted.

21 Claims, 12 Drawing Sheets

FIG. 8

IDENTIFICATION OF SUBGROUP INTERESTS

CLAIM OF PRIORITY

This application claims priority under 35 U.S.C. §119(e) to U.S. Patent Application Ser. No. 61/668,692, filed on Jul. 6, 2012, which is incorporated herein by reference in its entirety.

TECHNICAL FIELD

The present disclosure relates to identification of interests of a subgroup of a larger group of users.

BACKGROUND

Electronic communications platforms often allow users of the platforms to share information with one another and form connections with other users. Some platforms (e.g., social networking platforms) may allow users to explicitly indicate interest in or approval for content available through the platform by endorsing a content item. For example a user of a social networking platform may endorse a page available in the social networking platform by clicking on an endorsement link or icon on the page or presented next to a link or other reference to the page.

SUMMARY

This specification describes technologies relating to aggregating user interest information and determining special interests of subgroups to facilitate access to online content.

In general, one aspect of the subject matter described in this specification can be embodied in a method that includes receiving data reflecting characteristics for users in a set of users of a social networking platform, wherein the data reflects endorsements, by at least some of the users in the set, of pages hosted on the social networking platform. The method further includes identifying a subset of the users within the set by excluding users in the set with characteristics that do not match filter criteria. The method further includes, for each of at least some of the pages endorsed by members of the subset, calculating a measure of the likelihood of a user in the subset endorsing the page relative to the likelihood of other users in the set endorsing the page. The method further includes selecting one or more content items based on the measures and transmitting data specifying the selected content items.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including receiving data reflecting characteristics for users in a set of users of a social networking platform, wherein the data reflects endorsements, by at least some of the users in the set, of pages hosted on the social networking platform. The operations may further include identifying a subset of the users within the set by excluding users in the set with characteristics that do not match filter criteria. The operations may further include, for each of at least some of the pages endorsed by members of the subset, calculating a measure of the likelihood of a user in the subset endorsing the page relative to the likelihood of other users in the set endorsing the page. The operations may further include selecting one or more content items based on the measures and transmitting data specifying the selected content items.

In general, one aspect of the subject matter described in this specification can be embodied in a system that includes a network interface configured to receive data reflecting characteristics for users in a set of users of a social networking platform, wherein the data reflects endorsements, by at least some of the users in the set, of pages hosted on the social networking platform. The system may further include a module configured to identify a subset of the users within the set by excluding users in the set with characteristics that do not match filter criteria. The system may further include a module configured to calculate, for each of at least some of the pages endorsed by members of the subset, a measure of the likelihood of a user in the subset endorsing the page relative to the likelihood of other users in the set endorsing the page. The system may further include a module configured to select one or more content items based on the measures. The system may further include an interface configured to transmit data specifying the selected content items.

In general, one aspect of the subject matter described in this specification can be embodied in a computer readable media storing software including instructions executable by a processing device that upon such execution cause the processing device to perform operations that include receiving data reflecting characteristics for users in a set of users of a social networking platform, wherein the data reflects endorsements, by at least some of the users in the set, of pages hosted on the social networking platform. The operations may further include identifying a subset of the users within the set by excluding users in the set with characteristics that do not match filter criteria. The operations may further include, for each of at least some of the pages endorsed by members of the subset, calculating a measure of the likelihood of a user in the subset endorsing the page relative to the likelihood of other users in the set endorsing the page. The operations may further include selecting one or more content items based on the measures. The operations may further include transmitting data specifying the selected content items.

In general, one aspect of the subject matter described in this specification can be embodied in a method that includes receiving data reflecting characteristics for users in a set of users, the characteristics for at least some of the users including indications of endorsements of content items by the users. The method further includes receiving one or more parameters for a first user filter and identifying a subset of the set of users satisfying the one or more parameters of the first user filter by comparing the parameters of the first user filter to characteristics of users in the set. The method further includes, for each of several content items, determining a score for the content item based on a first count of users in the subset that have endorsed the content item and based on a second count of users in the set that have endorsed the content item. The method further includes selecting one or more content items based on the scores and transmitting data specifying the selected content items.

In general, one aspect of the subject matter described in this specification can be embodied in a system that includes a data processing apparatus and a memory coupled to the data processing apparatus. The memory having instructions stored thereon which, when executed by the data processing apparatus cause the data processing apparatus to perform operations including receiving data reflecting characteristics for users in a set of users, the characteristics comprising endorsements of content items. The operations may further include receiving one or more parameters for a first user filter. The operations may further include identifying a subset of the set of users satisfying the one or more parameters of the first user filter by comparing the one or more parameters of the first user filter to characteristics of users in the set. The operations may further include, for each of several content items, determining a score for the content item based on a first count of users in the subset that have endorsed the content item and based on a second count of users in the set that have endorsed the content item. The operations may further include selecting one or more content items based on the scores. The operations may further include transmitting data specifying the selected content items.

In general, one aspect of the subject matter described in this specification can be embodied in a system that includes a network interface configured to receive data reflecting characteristics for users in a set of users, the characteristics for at least some of the users including indications of endorsements of content items by the users. The system may further include an interface configured to receive one or more parameters for a first user filter. The system may further include a module configured to identify a subset of the set of users satisfying the one or more parameters of the first user filter by comparing the one or more parameters of the first user filter to characteristics of users in the set. The system may further include a means for determining, for each of several content items, a score for the content item based on a first count of users in the subset that have endorsed the content item and based on a second count of users in the set that have endorsed the content item. The system may further include a module configured to select one or more content items based on the scores.

In general, one aspect of the subject matter described in this specification can be embodied in a computer readable media storing software including instructions executable by a processing device that upon such execution cause the processing device to perform operations that include receiving data reflecting characteristics for users in a set of users, the characteristics comprising endorsements of content items. The operations may further include receiving one or more parameters for a first user filter. The operations may further include identifying a subset of the set of users satisfying the one or more parameters of the first user filter by comparing the one or more parameters of the first user filter to characteristics of users in the set. The operations may further include, for each of several content items, determining a score for the content item based on a first count of users in the subset that have endorsed the content item and based on a second count of users in the set that have endorsed the content item. The operations may further include selecting one or more content items based on the scores. The operations may further include transmitting data specifying the selected content items.

The foregoing and other embodiments can each optionally include one or more of the following features, alone or in combination.

All users in the set can be users of a social networking platform. The several content items are pages can be hosted by a social networking platform. The data specifying the selected content items can encode a display for presentation to a user on a remote computing device, the display including a list of the selected content items sorted based on the scores. The display further can include an additional list of content items with the highest counts of endorsements from users in the subset. Scores can be used to select a content item for presentation to a user in the subset. The content item selected for presentation can be one of the several content items. The content item selected for presentation can be related to one of the several content items. The method can also include receiving one or more parameters for a second user filter and identifying the set of users from a larger superset of users by comparing the one or more parameters of the second user filter to characteristics of each user in the superset. The one or more parameters of the second user filter can require users in the set to be users of an application. The one or more parameters of the second user filter can require users in the set to have endorsed at least one content item. Receiving data reflecting characteristics for each user in the set of users can include receiving data from a first user including characteristics for the first user and characteristics for other users that are connected with the first user in a social network. Determining the score for one of the several content items can include determining a ratio of the first count times a total number of users in the set to the second count times a total number of users in the subset. The method can also include checking if the ratio is less than one and if the ratio is less than one, inverting and negating the ratio. Determining the score for one of the several content items can include determining a first logarithm of a ratio of the first count multiplied by a total number of users in the set to the second count multiplied by a total number users in the subset, determining a second logarithm of a ratio of a total number of users in the set to a total number users in the subset, and determining a ratio of the first logarithm to the second logarithm. The method can also include identifying the several content items by determining, for each content item endorsed by a user in the subset, a difference between the first count divided by a total number of users in the subset and the second count divided by a total number of users in the set and identifying the several content items based on the differences. Identifying the several content items can include selecting a fixed number of content items with the largest differences. Identifying the several content items can include selecting content items for which the differences are above a threshold. The several content items can include all content items endorsed by at least one user in the subset. Selecting the one or more of the several content items can include ranking the several content items based on the scores.

The details of one or more implementations are set forth in the accompanying drawings and the description below. Other features and aspects will be apparent from the description, the drawings, and the claims.

BRIEF DESCRIPTION OF THE DRAWINGS

FIG. 8 is a diagram of an example GUI for a subgroup analysis application.

DETAILED DESCRIPTION

Figure 1A:
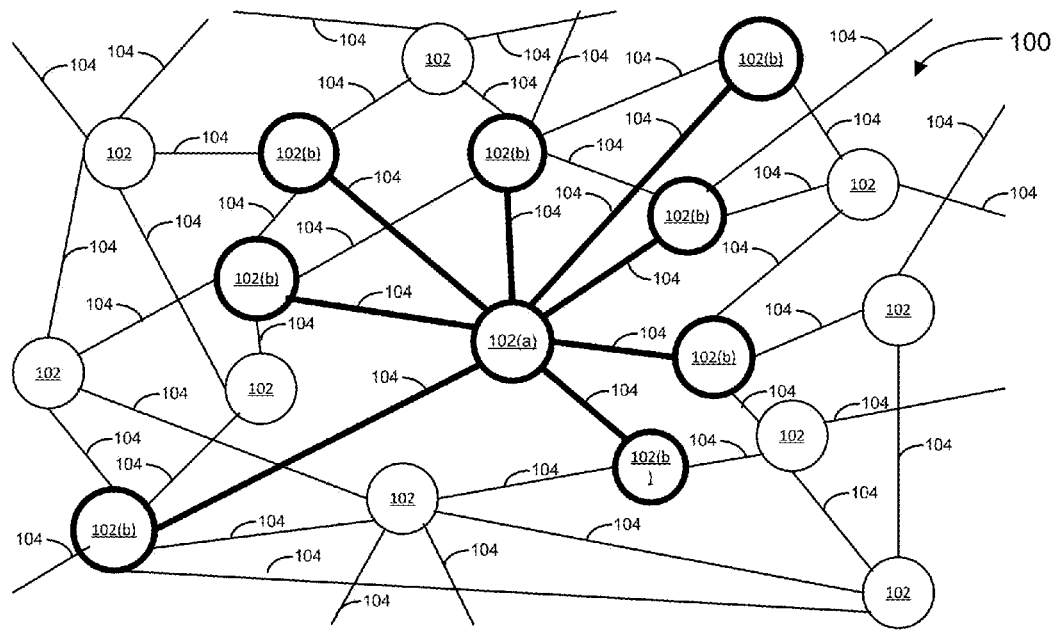
FIGS. 1A and 1B are schematic diagrams of examples of electronic social networking platforms.

Information about the interests of similar users (e.g., users sharing one or more demographic characteristics) may be useful in predicting the interests and behavior of particular users or groups of users. In one example, if a particular user is a member of a subgroup of users that has a high level (e.g., a level that is a statistically significant amount higher than the level of a larger group of users that includes the subgroup) of interest in a particular product, brand, or company, a suggestion may be made to the particular user to inspect content items associated with the product, brand, or company. In another example, it may be observed that a subset of users within a general population of users that have advanced degrees and live in a particular state are significantly more likely than the general population of users to enjoy and endorse the social networking page representing a particular author. Based on this observation, it may be inferred that a particular user within this subgroup who has not yet expressed an interest in the author is more likely than the average user to be interested in content associated with the author or similar content. Therefore, the particular user may be offered opportunities to access content associated with the author or similar content.

A social networking platform may allow users to express interest in a company or other entity, for example, by clicking an endorsement icon or link on a page for the company or other entity in the social networking platform. Interest levels in different pages among a particular subgroup of users of the social networking platform may be gauged based on scores for the pages that are calculated based on the number of users in the subgroup that have expressed interest in the pages and based on the number of users in a larger group of users of the social networking platform that have expressed interest in the pages. For example, the score for a page may be calculated based on a ratio of the percentage of users in the subgroup that have expressed interest in the page to the percentage of users in the larger group that have expressed interest in the page. In some implementations, these scores may be used to select a content item (e.g., an advertisement) for presentation to a user within the subgroup.

Social networking platforms allow users to interact with and form connections with other users, including people and business entities. An endorsement within a social networking platform is an explicit indication by a user of his or her interest in a content item. For example, a user may endorse a page hosted by a social networking platform by forming a connection with the page (e.g., by clicking an endorsement icon on the page).

A content item is any data that can be provided over an electronic communications network. For example, a page accessible to certain users of a social networking platform is a content item. A feed item is another example of a content item that is presented as part of a feed. An online advertisement, including a link to a landing page, is yet another example of a content item. A user identity is data stored in a social networking platform that represents the user in the social networking platform.

FIG. 1A is a schematic diagram of an example of an electronic social networking platform. As illustrated in FIG. 1A, the electronic social networking platform is represented as a graph 100 of nodes 102 connected by edges 104. In some implementations, each node 102 of graph 100 may represent an individual user identity of the electronic social networking platform. In such implementations, an edge 104 that connects two nodes 102 represents a connection that has been formed between the two user identities that are represented by the connected nodes 102. For example, the edges 104 that connect node 102(*a*) to nodes 102(*b*) represent connections that have been formed within the electronic social networking platform between the user identity represented by node 102(*a*) and the other user identities represented by nodes 102(*b*).

In some cases, an electronic social networking platform may define a particular user identity's social network as the group of other user identities to whom the user identity is directly connected. If this definition is applied within the electronic social networking platform illustrated in FIG. 1A, the social network for the user identity represented by node 102(*a*) would be defined as the group of other user identities represented by nodes 102(*b*).

In addition to enabling a user identity to establish connections to other user identities and thereby form a social network, some electronic social networking platforms may enable a particular user identity to divide the user identity's social network into one or more subsets of user identities who may, for example, share one or more characteristics of significance to the particular user identity. For example, a particular user of an electronic social networking platform may wish to define subsets of user identities within the particular user identity's social network that reflect other user identities with whom the particular user has a familial relationship, a professional relationship, or a social relationship. For ease of reference, such defined subsets of a particular user's social network may be referred to herein as "Friendlists."

An electronic social networking application may facilitate the sharing of information and the exchange of electronic communications between a particular user identity and other user identities that are part of the particular user identity's social network. For example, referring to the electronic social networking platform represented in FIG. 1A, the electronic social networking application may provide mechanisms that facilitate the exchange of electronic communications between the user identity represented by node 102(*a*) and the user identities represented by nodes 102(*b*) who are part of the social network of the user identity represented by node 102(*a*). In some implementations, the electronic social networking application may provide a mechanism that enables the user identity represented by node 102(*a*) to send private electronic messages to any one or more of the user identities represented by nodes 102(*b*). Furthermore, the electronic social networking application also may provide a mechanism that enables the user identity represented by node 102(*a*) to broadcast an electronic message that is shared publicly with all (or some defined subset of all, such as, for example, one or more "Friendlists") of the user identities represented by nodes 102(*b*). Additionally or alternatively, the electronic social networking application may provide a mechanism that enables the user identity represented by node 102(*a*) to send a directed electronic message to a user identity that is represented by a particular one of nodes 102(*b*). In such cases, the recipient user identity of the directed message may determine whether this directed message is shared publicly with other user identities of the electronic social networking platform.

In addition to enabling user identities to establish connections to other user identities, some electronic social networking platforms enable user identities to establish connections with other types of objects. For example, some social networking platforms may enable user identities to record information about a user's hometowns, current places of residence, or places they have visited (including geographic locations (e.g., such as cities, states, or countries) as well as commercial venues, local businesses, or places (e.g., such as restaurants, retail stores, parks, train or bus stations, airports, etc.)) by establishing connections to location objects within the electronic social networking platforms.

Additionally or alternatively, some social networking platforms may enable user identities to generate event objects within the electronic social networking platforms that represent events that users are hosting. After creating event objects for such events, users may be provided with mechanisms for inviting other users to the events. Furthermore, a connection may be established between an event object and a user identity within an electronic social networking platform as a result of the user identity being invited to the event and/or as a result of the user identity registering with the electronic social networking platform that a user of the user identity will be attending the event.

Similarly, some social networking platforms may enable users to record endorsements of various different types of interests, for example, by establishing connections from a user identity to interest objects that represent these interests. Interest objects typically may represent commercial (or at least non-personal) entities within social networking platforms. For example, interest objects may represent businesses, companies, organizations, institutions, places, brands, products, artists, bands, celebrities or other public figures, entertainment venues, media outlets, causes, communities, etc. In some electronic social networking platforms, these interest objects may be manifested within the electronic social networking platforms as so-called "pages." These pages may be maintained by one or more representatives of the interests they represent. In addition, among other features, these pages may provide information about the interests they represent. These pages also may provide conduits for enabling interaction between the interests they represent and the users of the user identities that have formed connections to the pages.

Furthermore, some social networking platforms may enable user identities to establish connections with independent applications that leverage the social networking platforms, for example, by granting the independent applications authorization to access or extract data from the electronic social networking platform on their behalf.

Figure 1B:
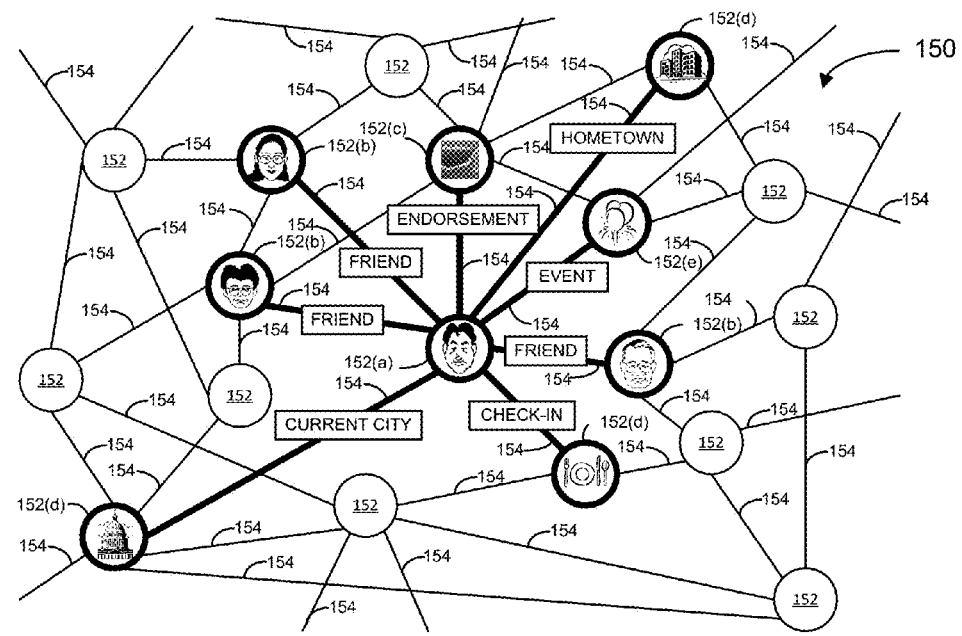

FIG. 1B is a schematic diagram of an example of an electronic social networking platform that enables user identities to form connections with multiple different types of objects including, for example, other user identity objects, location objects, event objects, and interest objects (e.g., pages). As illustrated in FIG. 1B, the electronic social networking platform is represented as a graph 150 of nodes 152 connected by edges. Each node 152 in the graph 150 represents a particular type of object in the electronic social networking platform. For example, nodes 152(a) and 152(b) represent user identity objects, while node 152(c) represents a non-personal enterprise object, nodes 152(d) represent location objects, and node 152(e) represents an event object.

An edge 154 that connects two nodes 152 represents a connection that has been formed between the two objects that are represented by the connected nodes 152. For example, the edges 154 that connect node 152(a) to nodes 152(b) represent connections that have been formed between the user identity represented by node 102(a) and the user identities represented by nodes 152(b). (For ease of reference, such a connection between two user identity objects in an electronic social networking platform may be referred to herein as a "friend" connection.)

Similarly, the edge 154 that connects node 152(a) to node 152(c) represents a connection between the user identity represented by node 152(a) and the interest object represented by node 152(c). (A user of an electronic social networking platform may form a connection to such an interest object in order to record an endorsement of the interest represented by the interest object.)

Furthermore, the edges 154 that connect node 152(a) to nodes 152(d) represent connections that have been formed between the user identity represented by node 152(a) and the location objects represented by nodes 152(d). Depending on the electronic social networking platform, a user identity may be able to establish various different types of connections to location objects.

For example, in order to store a record of a user of the user identity's hometown, the user identity may establish what may be referred to herein as a "hometown" connection to a location object that represents the user's hometown. Additionally or alternatively, in order to store a record of the user's current residence, the user identity may establish what may be referred to herein as a "current city" connection to a location object that represents the user's current residence.

Moreover, in order to store a record of a place the user visited (including geographic locations (e.g., such as cities, states, or countries) as well as commercial venues, local businesses or places (e.g., such as restaurants, retail stores, parks, train or bus stations, airports, etc.)), the user identity may establish what may be referred to herein as a "check-in" connection to a location object that represents a place that the user visited. In some cases, an electronic social networking platform may provide mechanisms that enable a user to manually "check-in" at a location. For example, a social networking platform may provide mechanisms that enable a user to manually define and/or search for a location object that corresponds to a location that the user is visiting (or has visited or plans to visit) and create a connection to the location object that corresponds to the location in order to "check-in" at the location. Additionally or alternatively, an electronic social networking platform may provide mechanisms that enable a user to "check-in" at a location in a more intelligent or automated fashion. For instance, a social networking platform may provide mechanisms that enable a user to "check-in" at a location using a mobile computing device (e.g., a smartphone or tablet computer) using global positioning system (GPS) and/or map data available to the mobile computing device.

Finally, the edge 154 that connects node 152(a) to node 152(e) represents a connection that has been formed between the user identity represented by node 152(a) and the event represented by event object 152(e). (For ease of reference, such a connection between a user identity object and an event object may be referred to herein as "event" connections.) There may be various different types of event connections between user identities and event objects in a social networking platform. For example, one type of an event connection between a user identity and an event object in a social networking platform may signify that the user of the user identity is the host of the event. Another type of an event connection between a user identity and an event object in a social networking platform may signify that the user has been invited to the event. Still another type of event connection between a user identity and an event object in a social networking platform may signify that the user has registered with the electronic social networking platform that the user will be attending the event. Yet another type of event connection between a user identity and an event object in a social networking platform may signify that the user has registered with the electronic social networking platform that the user will not be attending the event. Still one more type of event connection between a user identity and an event object in a social networking platform may signify that the user has registered with the electronic social networking platform that the user tentatively will be attending the event.

For example, as described in connection with FIG. 3A, a non-personal enterprise object within an electronic social networking platform may include a "page" that provides information about the non-personal enterprise that the object represents, and the electronic social networking platform may enable one or more designated representatives associated with the "page" to share information and exchange electronic communications with the user identities connected to the non-personal enterprise object in a manner in which such shared information or exchanged communications appear to involve the "page" as opposed to an individual user identity. In one particular example, the electronic social networking platform may provide a mechanism that enables one or more representatives associated with the non-personal enterprise to broadcast an electronic message that is shared publicly with all (or some defined subset of all) of the user identities to which the non-personal enterprise object is connected.

Additionally or alternatively, an event object within an electronic social networking platform also may be manifested as an "event page" that provides information about the event the object represents (e.g., date, time, and location information for the event), and the electronic networking platform may enable one or more designated representatives associated with the event (e.g., the hosts) to share information and exchange electronic communications with user identities for users who have been invited to the event via the "event page." In some electronic social networking platforms, both personal user identities and non-personal enterprise objects (and their representatives) may be able to create and host events.

Electronic social networking platforms often enable user identities to maintain user profiles or other collections of data that include information about the user to whom they correspond. Such a profile for an individual user identity of an electronic social networking platform may include, among other information, information about the user's hometown, current residence, age, gender, relationship status, educational background, and/or professional background. Additionally or alternatively, the profile for an individual user of an electronic social networking platform may include records of various different interests of the user (e.g., endorsements of interest objects).

In some electronic social networking platforms, at least some of the profile information recorded for an individual user identity may be represented by connections between the user identity and other types of objects within the electronic social networking platforms. For example, information about a user's hometown and/or current residence may be represented as a connection between the user identity and one or more different location objects, for example, as described above in connection with FIG. 1B. Additionally or alternatively, information about a user's interests may be represented as connections between the user identity and one or more different interest objects (e.g., pages), for example, as also described above in connection with FIG. 1B.

Different examples of electronic social networking platforms may provide various different types of user interfaces for interacting with the electronic social networking platforms. In one particular example, an electronic social networking platform may provide multiple different GUIs to a user to enable the use to interact with the underlying electronic social networking platform.

In this example, the electronic social networking platform may provide a first GUI to the user that (among other features) presents to the user a feed that includes: (i) electronic messages that have been shared with the user identity by other user identities who are members of the user identity's social network and/or by other types of objects (e.g., location, event, and interest objects) to which the user identity is connected; and/or (ii) information about activities engaged in within the context of the electronic social networking platform by users of other user identities who are members of the user identity's social network. (For ease of reference, this feed presented to a user in the first GUI provided by the electronic social networking platform may be referred to herein as the user identity's "news feed.")

In addition to the first GUI described above in connection with this example, the electronic social networking platform also may provide a second GUI to the user that (among other features) presents to the user a feed that includes: (i) electronic messages that have been shared by the personal user identity with members of the personal user identity's social network (either in a broadcast or a directed fashion); (ii) electronic messages that were shared with the user identity by members of the user identity's social network and that were directed specifically to the user identity (that the user identity nevertheless may allow other members of the user identity's social network to view); and (iii) information about activities engaged in within the context of the electronic social networking platform by the user. (For ease of reference, this feed presented to a user in the second GUI provided by the electronic social networking platform may be referred to as the user identity's "personal feed.")

Figure 2A:
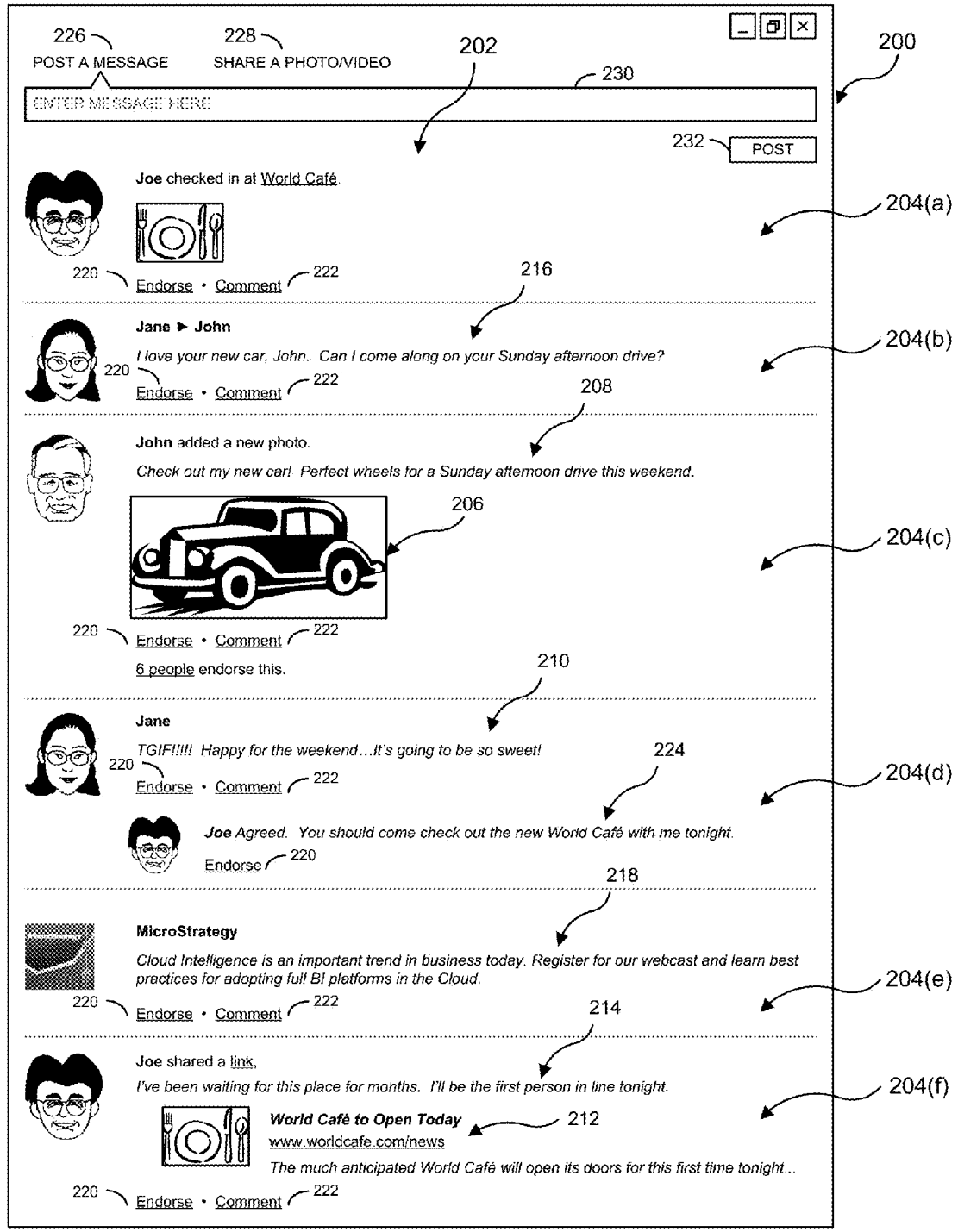
FIGS. 2A-2B and 3A-3B are diagrams of examples of graphical user interfaces (GUIs) for an example of an electronic social networking platform.
Figure 2B:
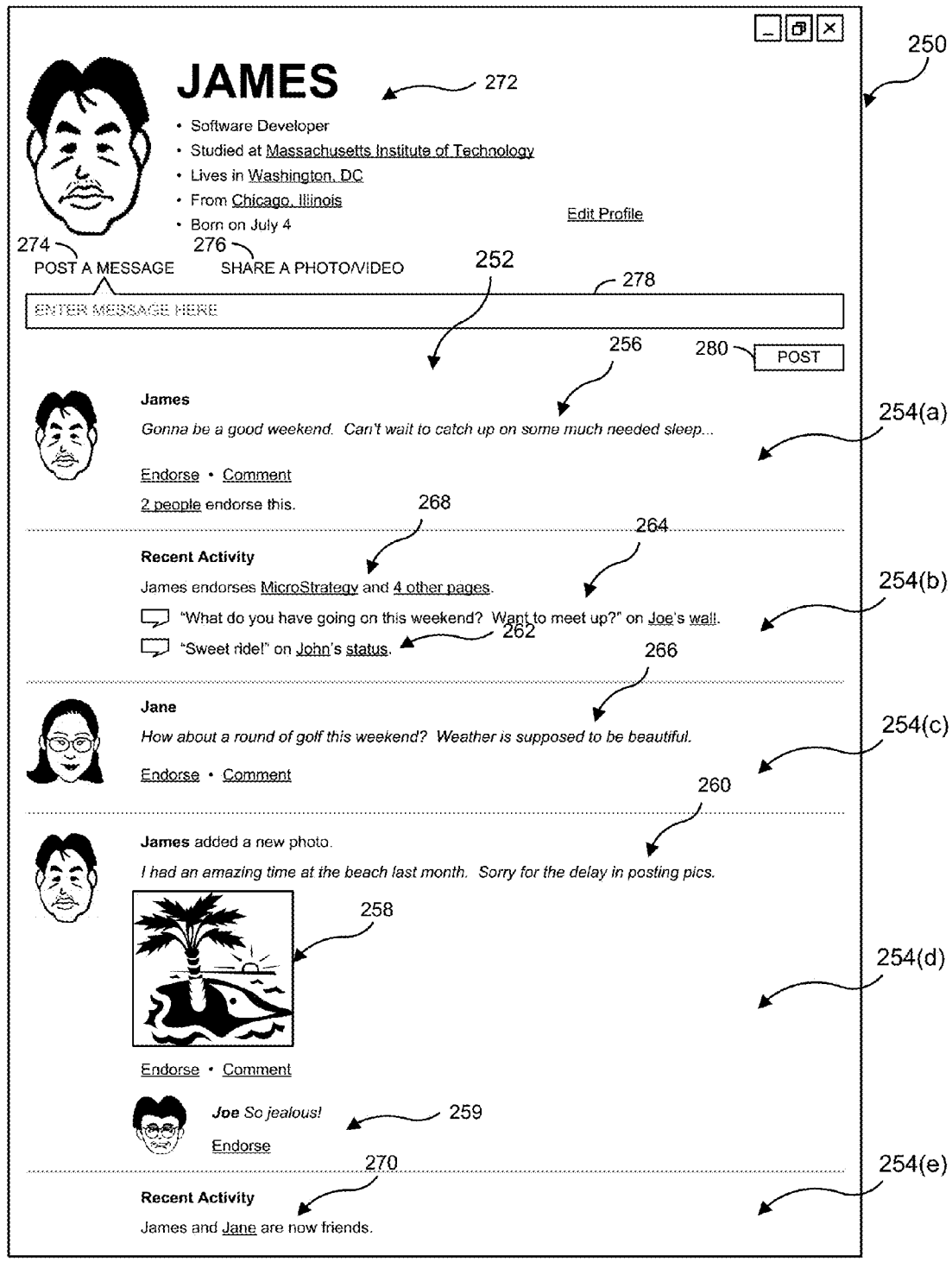

FIGS. 2A and 2B are diagrams of examples of two different GUIs 200 and 250, respectively, for an example of an electronic social networking platform. The GUI 200 presented in FIG. 2A illustrates an example of a GUI that presents a particular user identity's "news feed" 202 as described above, while the GUI 250 presented in FIG. 2B illustrates an example of a GUI that presents the particular user identity's "personal feed" 252 as described above.

Referring first to FIG. 2A, GUI 200 includes a "news feed" 202 that includes different feed items 204. The feed items 204 included within "news feed" 202 include content and/or electronic messages that have been shared with the particular user identity by other user identities who are members of the particular user identity's social network. For example, item 204(c) includes a picture 206 and a corresponding message 208 shared with the particular user identity by a member of the particular user identity's social network identified as John. Similarly, item 204(d) includes a message 210 shared with the particular user identity by a member of the particular user identity's social network identified as Jane, and item 204(f) includes a hyperlink 212 to a web page and a corresponding message 214 shared with the particular user identity by a member of the particular user identity's social network identified as Joe. Although not illustrated in FIG. 2A, in addition to enabling user identities to share pictures and hyperlinks with members of their social networks (e.g., as illustrated by items 204(c) and 204(f), respectively) the electronic social networking platform also may enable user identities to share other types of content with members of their social networks including, for example, videos.

Feed items 204(c), 204(d), and 204(f) may represent content and/or messages that the particular user identities who shared these items (i.e., John, Jane, and Joe, respectively) shared generally with multiple members of their own social networks. For ease of reference, messages and/or content that user identities share as general broadcast messages to multiple members of their social networks, such as, for example, picture 206 and corresponding message 208 of feed item 204(c), message 210 of feed item 204(d), and hyperlink 212 and corresponding message 214 of feed item 204(f), may be referred to herein as "status posts."

In addition to enabling user identities to send general broadcast messages to multiple members of their social networks, the electronic social networking platform also may enable user identities to send directed messages to individual user identities within their social networks. Such directed messages may be presented to the user identities to whom they are targeted within the targeted user identities' "personal feeds," and the electronic social networking platform may provide user identities with controls for configuring whether such directed messages also are shared with members of the targeted user identities' own social networks. In the event that a targeted user identity selects configuration settings that provide for directed messages to the targeted user to be shared with other members of the targeted user identity's social network, such directed messages may be presented to the other members of the targeted user identity's social network in their "news feeds."

Item 204(*b*) in the "news feed" 202 of the GUI 200 for a particular user identity of the electronic social networking platform is an example of a message 216 that was directed to a targeted user identity who is a member of the particular user identity's social network and who selected configuration settings that provided for the directed message to be shared with other members of the targeted user identity's own social network. More particularly, message 216 was directed to a member of the particular user identity's social network identified as John by another user identity identified as Jane. Because the user identity identified as John is a member of the particular user identity's social network and because the user identity identified as John selected configuration settings that provide for directed messages that target the user identity identified as John to be shared with other members of his social network, the directed message 216 from the user identity identified as Jane to the user identity identified as John is presented in the particular user identity's "news feed" 202. The user identity identified as Jane may or may not be a member of the particular user identity's own social network.

"News feed" 202 also includes information about activities engaged in within the context of the electronic social networking platform by other users of user identities who are members of the particular user identity's social network. For example, item 204(*a*) indicates that a user identified as Joe checked-in at a location identified as World Café. The location World Café may be represented as a location object within the electronic social networking platform and may correspond to, for example, a local restaurant.

The feed items 204 included within "news feed" 202 also include content and/or electronic messages that have been shared with the particular user identity by other types of objects (e.g., location, event, and interest objects) to which the user identity is connected. For example, item 204(*e*) includes a message 218 shared with the particular user identity by an interest object identified as MicroStrategy.

If the particular user identity is connected to a large number of non-personal enterprise objects (or other types of interest objects) that frequently share messages, the particular user identity's "news feed" 202 may be cluttered with messages shared by such non-personal enterprise objects (or other types of interest objects).

The feed items 204 presented in "news feed" 202 provide mechanisms that enable the particular user identity to react to the objects included within the items 204 presented in "news feed" 202. For example, as illustrated in FIG. 2A, each of the feed items 204 presented in "news feed" 202 includes a selectable "Endorse" control 220 and a selectable "Comment" control 222. A selectable "Endorse" control 220 in a feed item 204 enables the particular user identity to register an endorsement of the object(s) (e.g., content, message, and/or activity) included in the feed item 204. The electronic social networking platform records such endorsements and may present the number of endorsements registered in connection with the object(s) presented in a feed item 204 in connection with the presentation of the feed item itself. For example, feed item 204(*c*) includes an indication that six different user identities have registered endorsements of the picture and message included in feed item 204(*c*).

A selectable "Comment" control 222 in an item 204 enables the particular user to enter a responsive comment to the object(s) included in the feed item 204. The electronic social networking platform records such responsive comments and associates them with the object(s) included in the feed item so that the electronic social networking platform may present any such responsive comments in connection with the presentation of the feed item 204 itself. For example, feed item 204(*d*) includes a message 224 by a user identity identified as Joe that was entered in response to the message 210 originally shared by the user identity identified as Jane.

In addition to "news feed" 202, GUI 200 also includes a selectable "Post Message" control 226, a selectable "Share Photo/Video" control 228, and an associated text entry field 230 and selectable "Post" control 232. Selectable "Post Message" control 226 enables the particular user to compose and post a status message by entering text in associated text entry field 230 and invoking selectable "Post" control 232. Similarly, selectable "Share Photo/Video" control 228 enables the particular user to share a picture or a video and to compose and post a corresponding status message by entering text in associated text entry field 230 and invoking selectable "Post" control 232.

Referring now to FIG. 2B, GUI 250 includes a "personal feed" 252 that includes different feed items 254. The feed items 254 included within "personal feed" 252 include content and/or electronic messages that the particular user identity shared with other members of the particular user identity's social network. Such content and/or electronic messages may include status posts that the particular user identity broadcasted generally to multiple members of the particular user identity's social network, responsive comments that the particular user identity entered in response to content and/or messages shared by other user identities who are members of the particular user identity's social network, and directed messages that the particular user identity shared with specifically targeted individual user identity's who are members of the particular user identity's social network.

For example, feed item 254(*a*) includes a status post 256 that the particular user identity broadcasted generally to multiple members of the particular user identity's social network. Similarly, item 254(*d*) includes a picture 258 and a corresponding message 260 that the particular user identity broadcasted generally to multiple members of the particular user identity's social network. To the extent that members of the particular user identity's social network enter responsive comments to and/or endorse status posts that the particular user identity broadcasts generally to multiple members of the particular user identity's social network, any such responsive comments or endorsements also may be presented within "personal feed" 254. For example, feed item 254(*a*) includes an indication that two user identities have endorsed message 256. Similarly, feed item 254(*d*) includes a message 259 that was entered by a member of the particular user identity's social network identified by the user identity Joe in response to the picture 258 and corresponding message 260 originally posted by the particular user identity.

Feed item 254(b) includes a responsive comment 262 that the particular user identity entered in response to content and/or a message shared by a member of the particular user identity's social network identified by the user identity John. Feed item 254(b) also includes a directed message 264 that the particular user identity shared with a specifically targeted member of the particular user identity's social network identified by the user identity Joe.

The feed items 254 included in "personal feed" 252 also include content and/or messages that were shared with the particular user identity by members of the particular user identity's social network and that were directed specifically to the particular user identity. For example, feed item 254(c) includes a message 266 that was shared with the particular user identity by a member of the particular user identity's social network identified by user identity Jane and that was directed specifically to the particular user identity.

In addition, the feed items 254 in "personal feed" 252 also include information about activities engaged in by the particular user within the context of the electronic social networking platform. For example, feed item 254(b) includes an indication 268 that the particular user identity has endorsed an interest object identified as MicroStrategy as well as four additional interest objects, all of which, as described in connection with FIG. 3A, may be manifested within the electronic social networking platform in the form of individual pages. Feed item 254(e) includes an indication 270 that the particular user identity has established a connection within the electronic social networking platform to the user identity identified as Jane.

In addition to "personal feed" 252, GUI 250 also includes a profile section 272 with profile information for the particular user identity. As illustrated in FIG. 2B, profile section 272 indicates that the particular user identity is identified by user identity James and includes profile information that specifies the particular user's professional background (software developer), alma mater (Massachusetts Institute of Technology), current residence (Washington, D.C.), hometown (Chicago), and birthday (July 4).

As with GUI 200, GUI 250 also includes a selectable "Post Message" control 274, a selectable "Share Photo/Video" control 276, and an associated text entry field 278 and selectable "Post" control 280. Selectable "Post Message" control 274 enables the particular user identity to compose and post a status message by entering text in associated text entry field 278 and invoking selectable "Post" control 280. Similarly, selectable "Share Photo/Video" control 276 enables the particular user to share a picture or a video and to compose and post a corresponding status message by entering text in associated text entry field 278 and invoking selectable "Post" control 280.

Figure 3A:
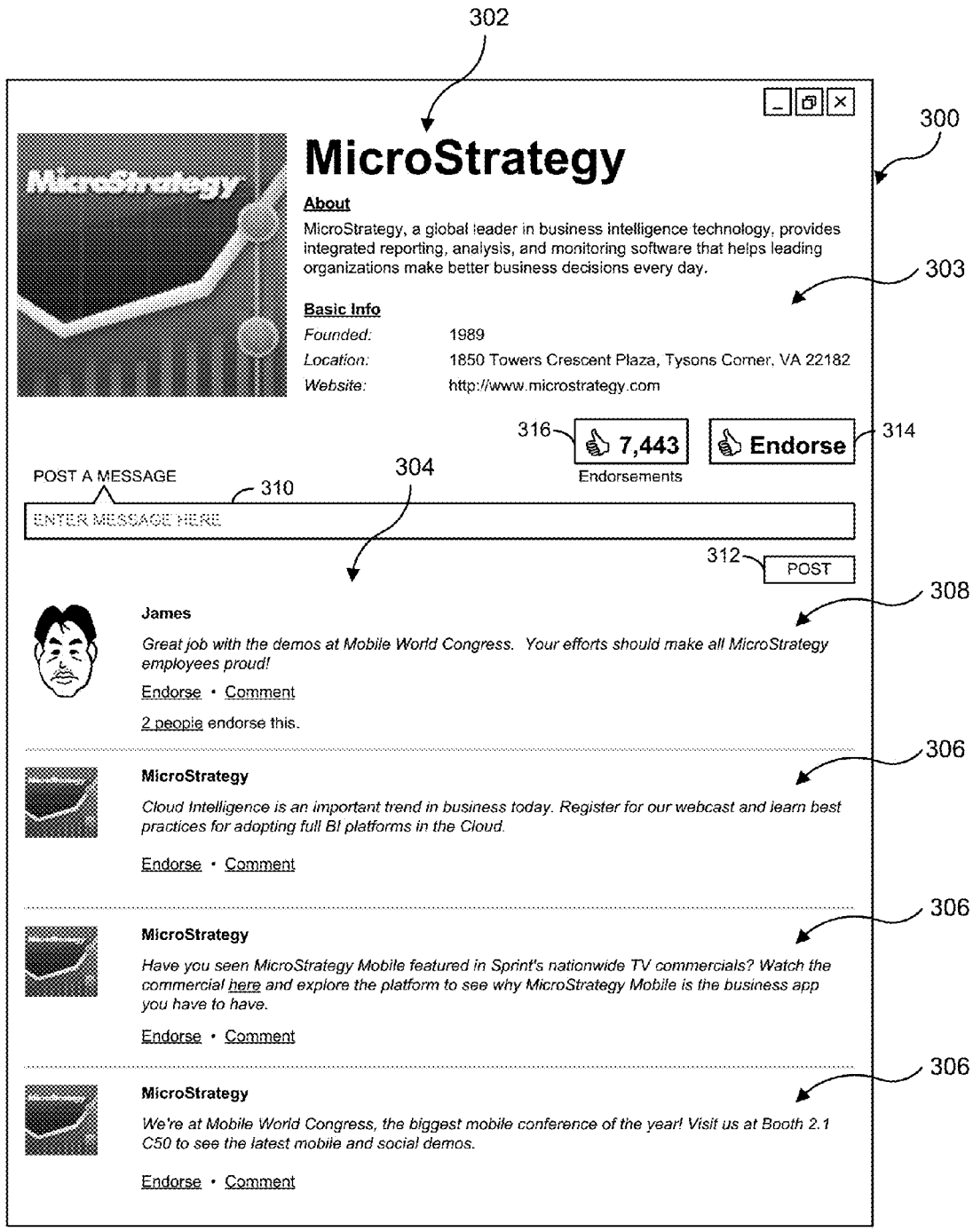

In some electronic social networking platforms, interests may be represented as interest objects that include "pages." FIG. 3A is a diagram of an example of a GUI 300 for an example of an electronic social networking platform within which interests are represented as interest objects that include pages. More particularly, GUI 300 is displaying an interest page 302 that represents an interest object for MicroStrategy, a software and technology company. As illustrated in FIG. 3A, the MicroStrategy interest page includes an information section 303 that provides background information about MicroStrategy. The MicroStrategy interest page 302 also includes a feed 304 that includes, among other content, messages 306 generated by the MicroStrategy interest page and shared with one or more other user identities of the electronic social networking platform to which the MicroStrategy interest page 302 is connected (e.g., one or more user identities who have recorded with the electronic social networking platform endorsements of the MicroStrategy interest object represented by the MicroStrategy interest page 302). In addition, as illustrated in FIG. 3A, the feed 304 also includes directed messages 308 posted to the MicroStrategy interest page 302 by user identities of the electronic social networking platform. For example, a user of the electronic social networking platform may post a message to the MicroStrategy interest page 302 by entering text in text entry field 310 and invoking selectable "Post" control 312. Although not illustrated as such in FIG. 3A, feed 304 also may include various additional or alternative types of content items.

Notably, MicroStrategy interest page 302 also includes a selectable "Endorse" control 314 that enables users who view the MicroStrategy interest page 302 and who have not already endorsed MicroStrategy to record an endorsement of MicroStrategy as one of their interests. In response to invocation of selectable endorse control 314 by a particular user, the electronic social networking platform records that the particular user identity has endorsed MicroStrategy as an interest, for example, by establishing a connection between the object that represents the particular user identity in the platform and the interest object that represents MicroStrategy within the electronic social networking platform. MicroStrategy interest page 302 also includes an indication 316 reporting that 7,443 user identities already have endorsed MicroStrategy within the electronic social networking platform.

In some electronic social networking platforms, interests endorsed by a particular user identity may be shared with or otherwise made available to other user identities of the electronic social networking platform. In particular, in some electronic social networking platforms, interests endorsed by a particular user identity may be shared with other user identities who are members of the particular user identity's social network. For example, an electronic social networking platform may provide users whose user identities are members of a particular user identity's social network with access to a detailed user identity profile page that includes, among other information, indications of interests that the particular user has endorsed within the electronic social networking platform.

Figure 3B:
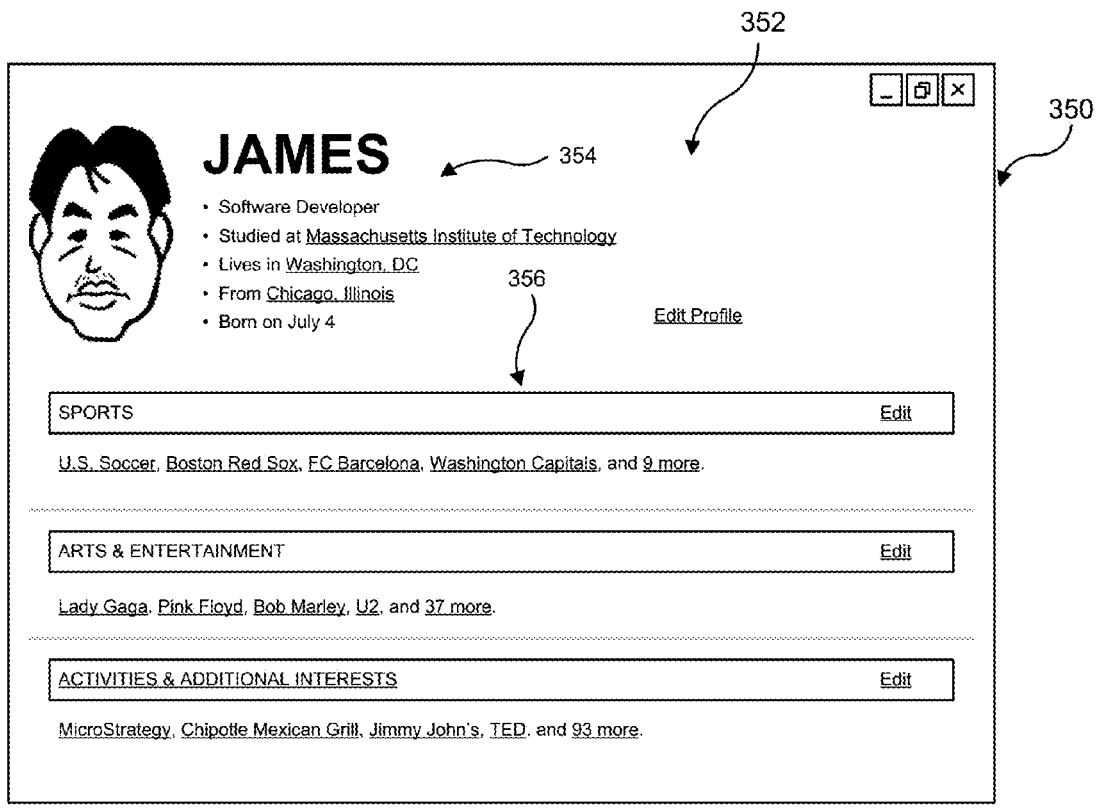

FIG. 3B is a diagram of an example of a GUI 350 for an example of an electronic social networking platform that provides users of user identities that are members of a particular user identity's social network with access to a detailed user identity profile. In particular, GUI 350 is displaying a detailed profile page 352 for a user identity of the electronic social networking platform identified as James. As illustrated in FIG. 3B, the detailed profile page 352 includes a biographic details section 354 that reports certain biographic information about the particular user identity including the particular user identity's job title (software developer), alma mater (Massachusetts Institute of Technology), current residence (Washington, D.C.), hometown (Chicago), and birthday (July 4). In addition, the detailed profile page 352 also includes an interests section 356 that lists various different interests that the particular user identity has endorsed within the electronic social networking platform. As illustrated in FIG. 3B, one of the interests that the particular user identity has endorsed within the electronic social networking platform is MicroStrategy. The particular user may have recorded his endorsement of MicroStrategy by invoking the "Endorse" control 314 included in the MicroStrategy interest page 302 as illustrated in FIG. 3A.

Figure 4A:
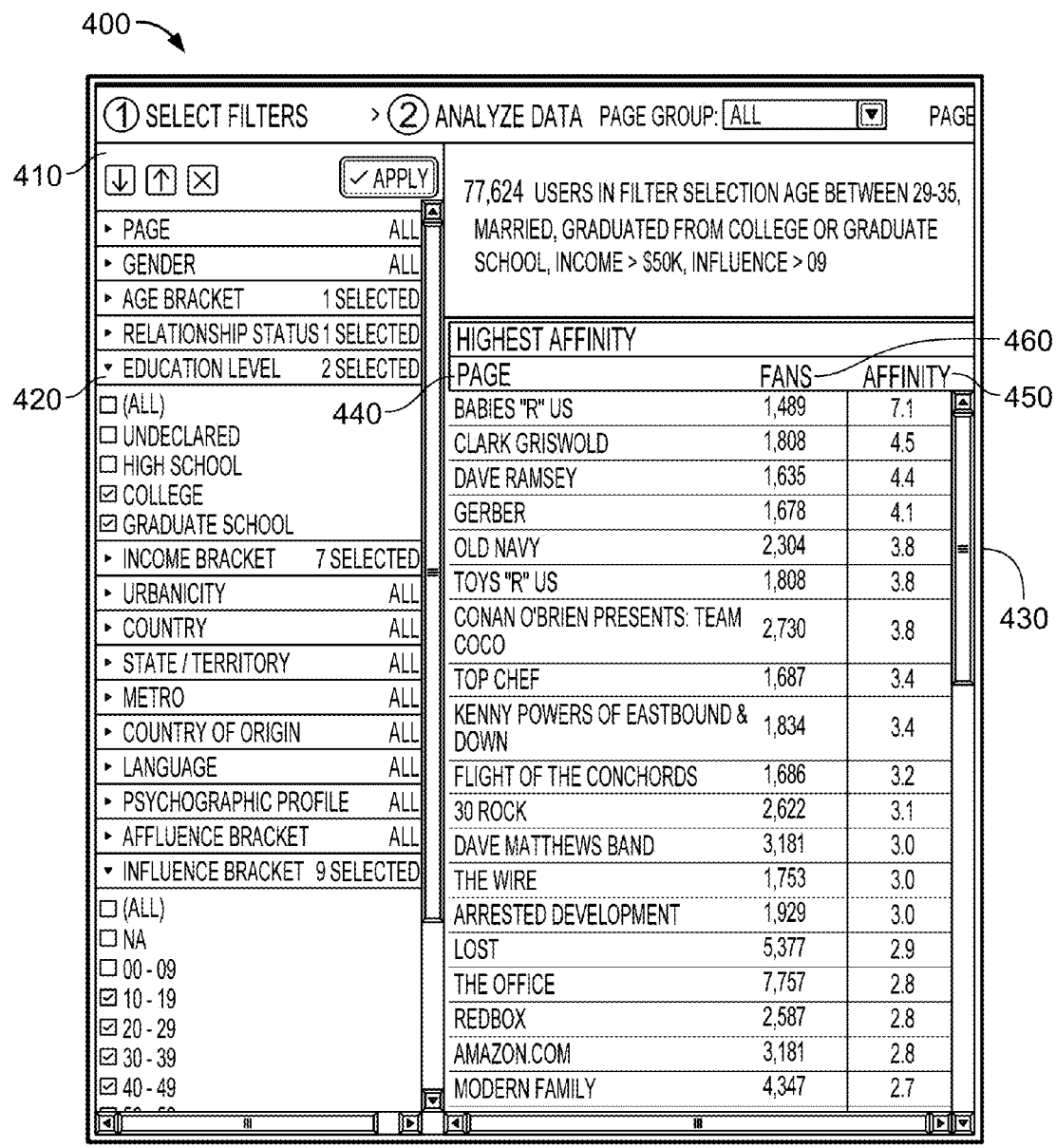
FIGS. 4A-4B are diagrams of an example GUI for a subgroup analysis application.

FIG. 4A depicts an example GUI 400. In general, GUI 400 provides a ranked list of pages based on interest in the pages by a subgroup of users within a larger group of users. The subgroup may be selected from the larger group of users using filter parameters, and the list of pages reflects how the interests of the subgroup compare to the larger group of users. More particularly, GUI 400 includes a user filter pane 410 that facilitates the entry of user filter parameters that may be used to identify a subgroup of users of a larger group of users for specialized interest analysis.

For example, the larger group of users may be users of a social networking platform. Users of the social networking platform may submit demographic information and/or other characteristics that are stored as part of their user identities, and a subgroup of users of the social networking platform may be identified from among the larger group of users by comparing these characteristics to values or ranges specified by filter parameters entered through filter pane 410. Filter pane 410 includes a parameter selection block 420 corresponding to the user characteristic of education level. For example, a user of GUI 400 may select one or more of the check boxes in parameter selection box 420 to specify the levels of education that are desired in the subgroup that will be used for interest analysis. Other filter parameters can include, for example, gender, age, relationship status, income, language, area of residence, and influence or other metrics derived from user data. Parameters corresponding to multiple characteristics may be entered to limit the subgroup based on multiple characteristics.

GUI 400 also includes a content items pane 430. The content items pane 430 includes a sorted list 440 of pages in a social networking platform that have been endorsed by a subset, determined by the user filter parameters, of a set of users for which user data is available. The pages are ranked and sorted based on displayed scores labeled "Affinity" that, as described in greater detail below, are based on a count of users in the subset that have endorsed each page and based on a count of users in the larger set that have endorsed each page. These scores may indicate the relative interest level in the page of users in the subset compared to the wider set of users. The content items pane 430 also includes a display of a count 460 (labeled "Fans") of users in the subset that have endorsed the page. As such, the column of scores labeled 450 "Affinity" may provide a measure of relative popularity of a page within the subgroup, while the "Fans" count provides an absolute measure of popularity within the subgroup without comparison to a larger group.

Some implementations of the GUI 400 may provide a metric for evaluating whether or to what extent online content is of particular or special interest to a subgroup of users within a larger group of users. Some implementations may facilitate group and subgroup identification for interest analysis. Some implementations may direct a user within a subgroup to online content that is of interest to that user.

Figure 4B:
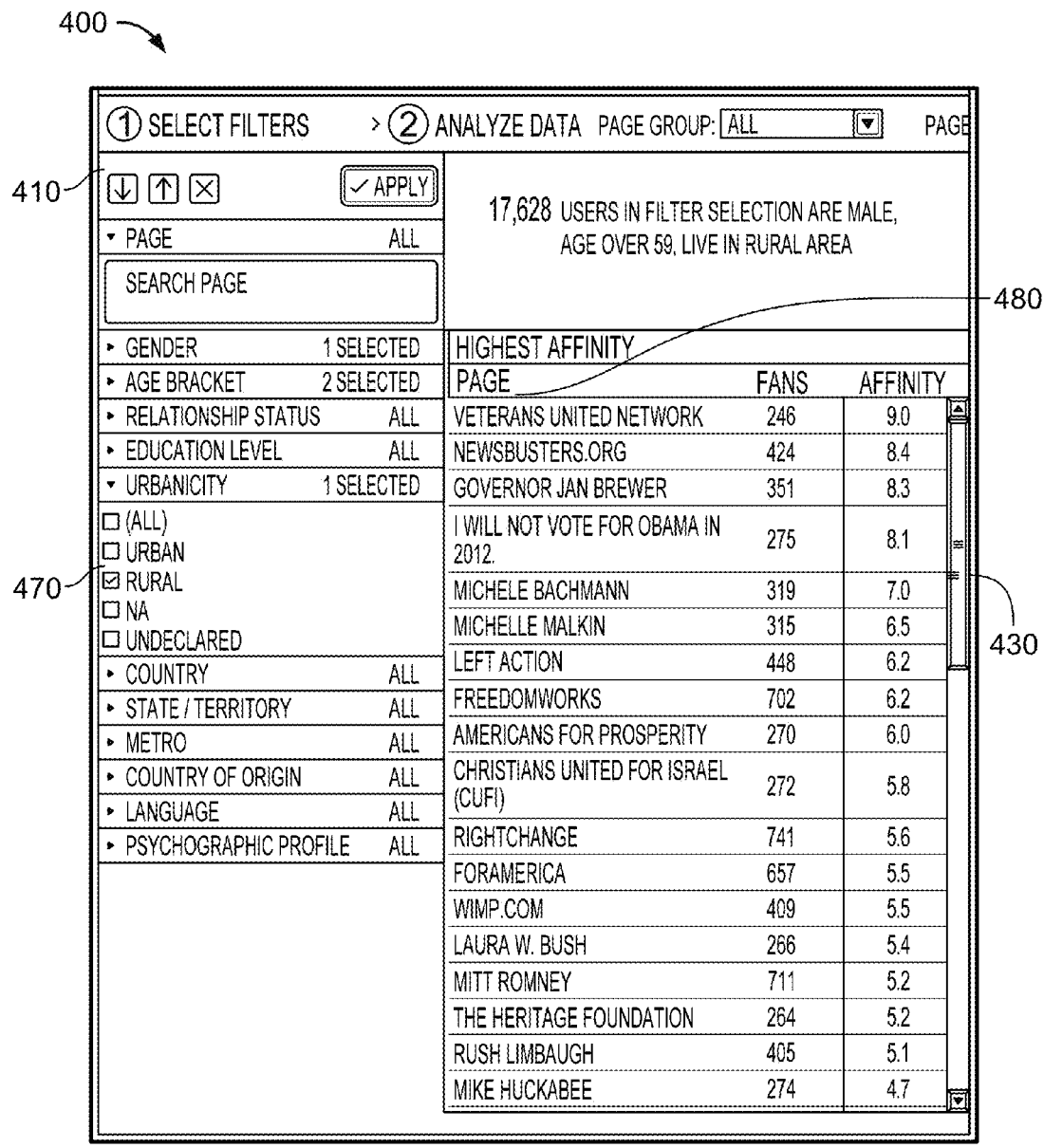

FIG. 4B depicts another configuration of example GUI 400. In this view, the filter parameters 470 in filter pane 410 have been configured differently than the filter parameters 420 of FIG. 4A. While the filter parameters 420 of FIG. 4A were used to select a subgroup of users in a larger set of users that are married, aged 29-35, had college or graduate degrees, had estimated income of over $50,000, and had influence metric values over 9, the filter parameters 470 of FIG. 4B were used to select a subgroup of users in the same larger set of users that are male, over 59 years of age, and live in rural areas. As a result of these different configurations of the subset selection filter parameters in filter pane 410, GUI 400 presents a list of pages 480 with the highest "Affinity" (i.e., relative popularity with the filtered subgroup) in the content items pane 430 that is substantially different from the list of pages 440. By configuring the subgroup filter differently, a user of the GUI 400 may compare the relative interests of different subgroups with a larger group of users.

Figure 5:
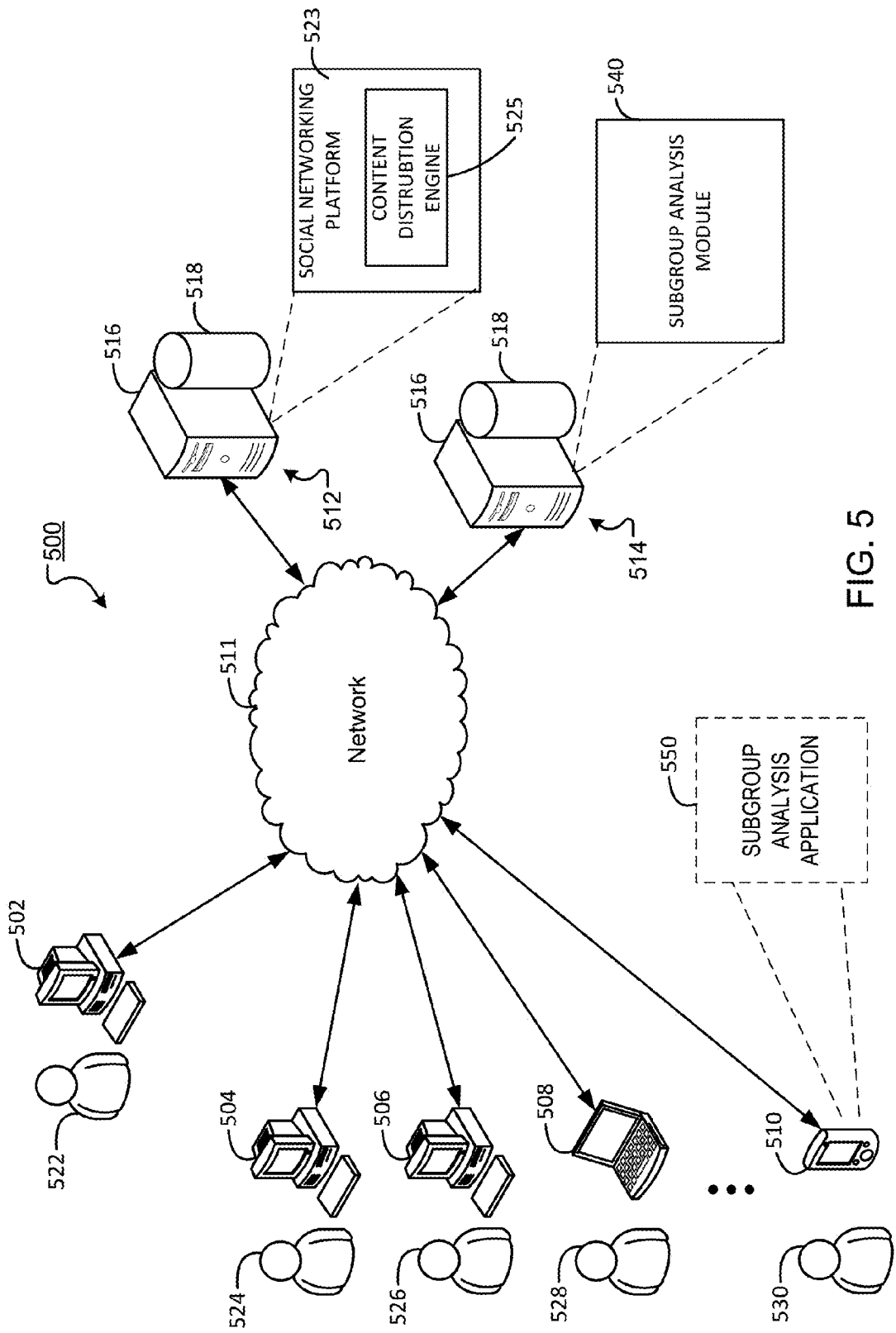
FIG. 5 is a block diagram of an example network environment.

FIG. 5 is a block diagram showing an example of a network environment 500 within which techniques described herein may be implemented. Network environment 500 includes computing devices 502, 504, 506, 508, and 510 that are configured to communicate with a first server system 512 and/or a second server system 514 over a network 511. Computing devices 502, 504, 506, 508, and 510 have respective users 522, 524, 526, 528, and 530 associated therewith. The first and second server systems 512, 514 each include a computing device 516 and a machine-readable repository, or database 518. Example environment 500 may include many thousands of Web sites, computing devices and servers, which are not shown.

As described below, the network environment 500 includes a subgroup analysis module 540 that may interact with a subgroup analysis application 550 to generate the subgroup interest analysis described herein. The subgroup analysis module 540 may access and aggregate user interest or endorsement information and other characteristics of users of social networking platform 523 directly from server system 512 or indirectly through user computing devices 502, 504, 506, 508, and 510. User filter parameters may be applied to identify a subgroup of users for interest analysis and scores reflecting the interests of users in the subgroup in content items relative to users in a wider group of users may be generated. These scores may be used to facilitate access of users (e.g., users 522, 524, 526, 528, and 530) to content items of interest to those users.

Network 511 may include a large computer network, examples of which include a local area network (LAN), wide area network (WAN), the Internet, a cellular network, or a combination thereof connecting a number of mobile computing devices, fixed computing devices, and server systems. The network(s) included in network 511 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 502, 504, 506, 508, and 510 enable respective users 522, 524, 526, 528, 530 to access and to view documents, e.g., Web pages included in Web sites. For example, user 522 of computing device 502 may view a Web page using a Web browser running on computing device 502. The Web page may be provided to computing device 502 by server system 512, server system 514 or another server system (not shown).

In example environment 500, computing devices 502, 504, 506 are illustrated as desktop-type computing devices, computing device 508 is illustrated as a laptop-type computing device 508, and computing device 510 is illustrated as a mobile computing device. It is noted, however, that computing devices 502, 504, 506, 508, and 510 may include, e.g., a desktop computer, a laptop computer, a handheld computer, a tablet computing device, a personal digital assistant (PDA), a cellular telephone, a network appliance, a camera, a smart phone, an enhanced general packet radio service (EGPRS)

mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

Users interacting with computing devices 502, 504, 506, 508, and 510 can participate in a social networking platform 523 hosted, e.g., by the server system 512, by uploading and downloading electronic content to the social network. The electronic content may include, among other content, text comments (e.g., status updates, announcements, and replies), digital images, videos, audio files, and/or other appropriate information. In some implementations, information can be posted on a user's behalf by systems and/or services external to social networking platform 523 or to server system 512. For example, the user may post a review of a movie to a movie review Web site, and, with proper permissions, that Web site may cross-post that review to social networking platform 523 on the user's behalf. The user may include, with a post, a tag, which includes a hyperlink to a discussion forum about a particular topic (e.g., the movie). The tag typically relates to the topic of the post (although that need not be the case always). The discussion forum contains posts by the user and others who have included similar tags on their posts.

Generally, users interacting with the computing devices 502, 504, 506, 508, and 510 can also use social networking platform 523 to establish connections with other users of the social networking platform 523 and other objects accessible through the social networking platform 523. Electronic content can be distributed to contacts within social networking platform 523, including users that are connected to the source node (e.g., the user identity of a user that created the electronic content), so that such content is viewable by the indicated contacts and/or contacts, or others. In an example operation, a user of social networking platform 523 can generate content and indicate, e.g., one or more individual social network contacts and/or categorized groups of contacts to which the generated content is to be distributed. During a content write-time, a content data set is transmitted from the user's client computing device (e.g., computing device 502) to a distribution hub (e.g., a content distribution engine 525), which can be provided at a server (e.g., server system 512 or elsewhere on the network). In some implementations, the content data set may include content data (e.g., text, identity of the content author, tag, uniform resource indicator (URI), timestamp data (e.g., a timestamp indicating the time that the content was generated)), distribution data (e.g., data identifying contacts and/or one or more social circles), and identification (ID) data (e.g., an ID assigned to the content data set upon generation of the content).

In some implementations, the distribution data is processed to provide an access control list (ACL) that specifies which contacts within the social network are granted access to the content. For example, distribution data can indicate that content is to be accessible by, and/or distributed to, a particular user or a particular class of users.

Generally, the distribution hub determines end points to which the content data set is to be distributed based, e.g., on the ACL. For example, the set of contacts that may care about the content and/or that are allowed access to the content is determined based on the ACL, and the ID of the content is written to a per user/view index at the distribution hub. When fetching content to distribute to a user, the user/view index is accessed and the IDs of the various contents that the user is allowed to view are determined. The content data sets are retrieved from a data store (e.g., data store 518) and are transmitted to a client device associated with the requesting user. Content may be distributed to a user's main page for inclusion in a content stream.

A subgroup analysis module 540 may be included in a server system 514. The subgroup analysis module 540 may receive user data reflecting user characteristics and interests, including endorsements, via a network from user computing devices (e.g., computing devices 502, 504, 506, 508, and 510) or from other servers storing user data (e.g. server system 512 running social network platform 523). User filter parameters may also be received from user computing devices via a network interface or through a user interface of the system server 514. User filter parameters may be compared to user characteristics to identify a subset of the users. Content items (e.g., pages hosted by social networking platform 523) of interest to the subset of users are identified and scores reflecting the specialized interest level of the subset may be determined for each of the identified content items. The score for a content item is determined based on the number of users in the subset that have endorsed the content item and the number of users in the larger set that have endorsed the content item. Content items may then be selected by the subgroup analysis module 540 based on these scores and information specifying the selected content items is transmitted (e.g., to a user device or to an advertiser's server).

A user device (e.g., mobile computing device 510) may include a subgroup analysis application 550. The subgroup analysis application 550 may facilitate communications of a user with the subgroup analysis module 540. The subgroup analysis application 550 is a client that interacts with the server provided by the subgroup analysis module 540. Various amounts of the functionality described in relation to the subgroup analysis module 540 may be performed by one or both of the subgroup analysis module 540 and the subgroup analysis application 550. In some implementations, the subgroup analysis application 550 may present a GUI (e.g., GUI 400) to a user to allow the user to input user filter parameters for transmission to the subgroup analysis module 540 and to display to the user sorted ranked lists of content items that are generated by and received from the subgroup analysis module 540. In some implementations, the subgroup analysis application 550 may provide all the functionality of the subgroup analysis module 540 based on the user data that is accessible to user 530.

Figure 9:
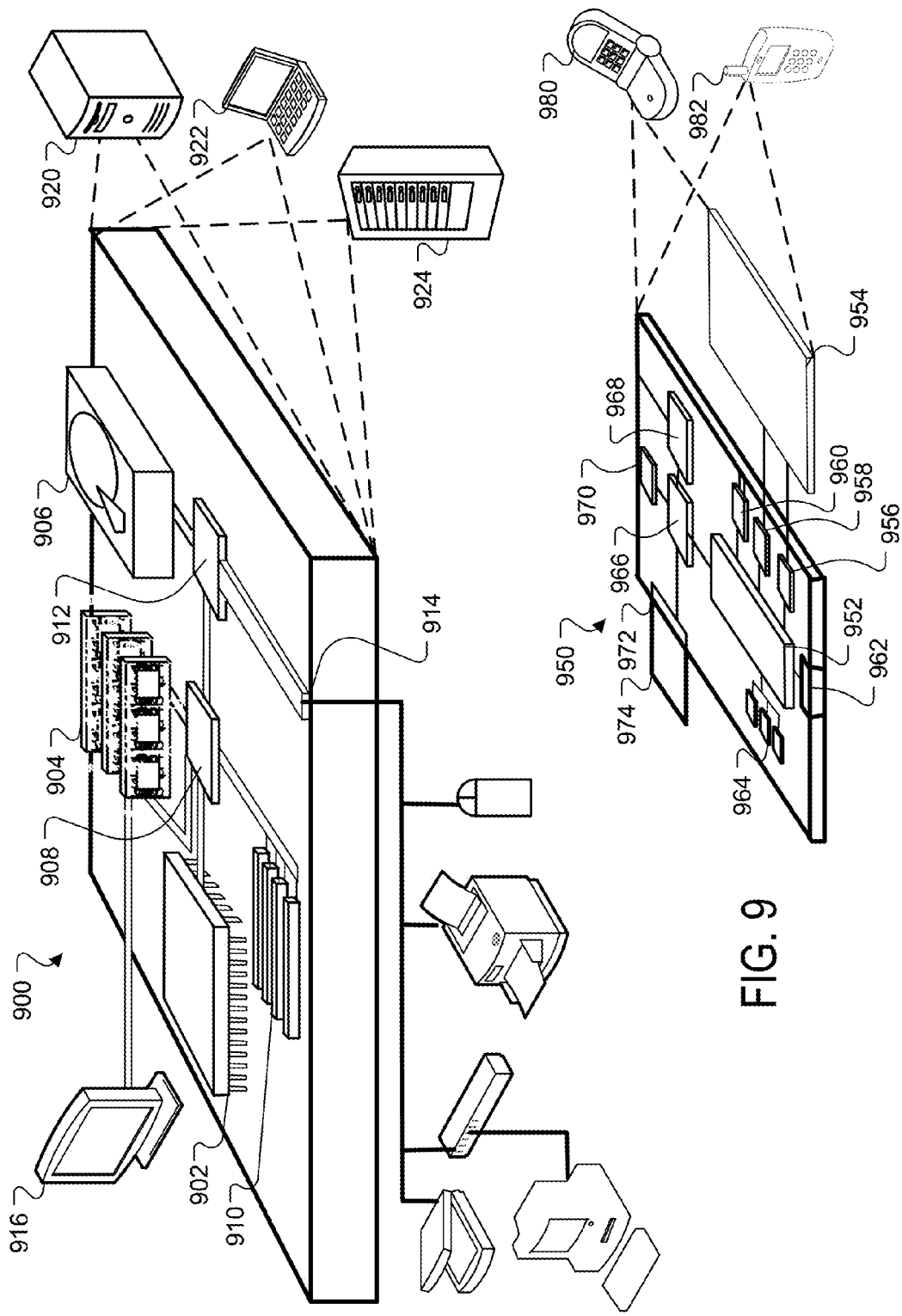
FIG. 9 shows examples of a computer device and a mobile computer device that can be used to implement techniques described here.

The subgroup analysis module 540 may be implemented as software, hardware or a combination of software and hardware that is executed on a processing apparatus, such as one or more computing devices (e.g., a computer system as illustrated in FIG. 9). The subgroup analysis application 550 may be implemented as software, hardware or a combination of software and hardware that is executed on a mobile computing device (e.g., mobile computing device 950).

Figure 6:
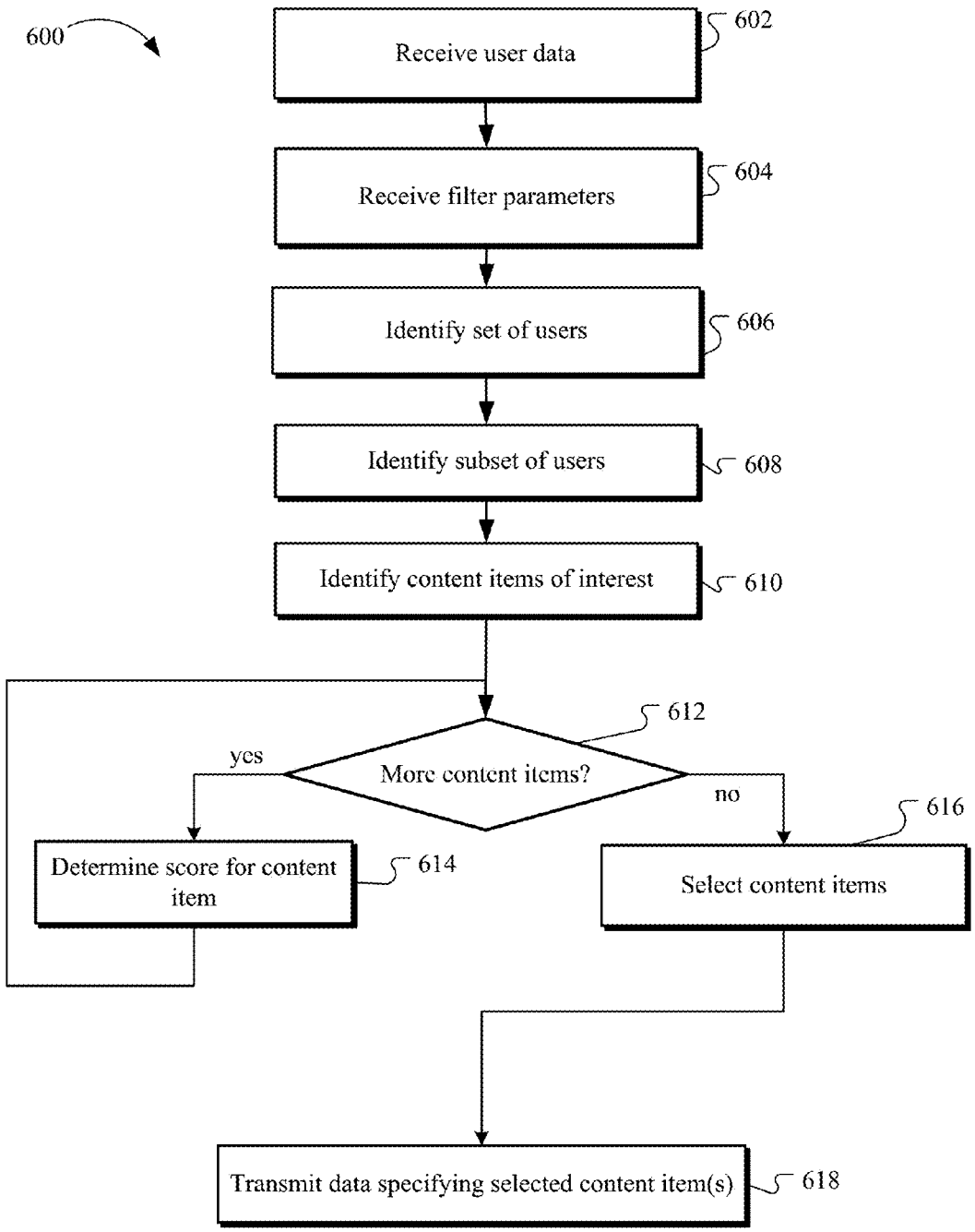
FIG. 6 is a flow chart of an example process for determining interests that are particular to a subgroup.

FIG. 6 is a flow chart of an example process 600 for determining interests that are particular to a subgroup. Data reflecting user characteristics and interests (e.g., endorsements of pages hosted in a social networking platform) of a set of users is received. User filter parameters are received and compared to user characteristics to identify a subset of the users. Content items of interest to the subset of users (e.g., pages hosted in a social networking platform endorsed by the users) are identified and scores reflecting the specialized interest level of the subset of users relative to the larger set of users are determined for each of the identified content items. The score for a content item is based on the number of users in the subset that have endorsed the content item and the number of users in the set that have endorsed the content item (the set including a larger number of users than the subset). Content items are then selected based on these scores and information specifying the selected content items is transmitted (e.g., to a user device or to an advertiser's server). For example, content items that have relatively high scores, reflecting disproportionately high interest in the content items among users within the subset relative to the larger set of users, may be selected. Additionally or alternatively, content items that have relatively low scores, reflecting disproportionately low interest in the content items among users within the subset relative to the larger set of users, may be selected.

The process 600 can be implemented, for example, by the subgroup analysis module 540 in the server system 514 of FIG. 5. In some implementations, the server system 514 is a data processing apparatus that includes one or more processors that are configured to perform actions of the process 600. For example, the data processing apparatus may be a computing device (e.g., as illustrated in FIG. 9). In some implementations, process 600 may be implemented in whole or in part by the subgroup analysis application 550 that is executed by the mobile computing device 510. In some implementations, a computer readable medium can include instructions that when executed by a computing device (e.g., a computer system) cause the device to perform actions of the process 600.

User data is received 602. The data may reflect characteristics (e.g., demographic characteristics such as age, gender, location, and occupation and social characteristics such as connections or influence) for each user in a set of users. The user data also includes endorsements of content items by some of the users. The user data may be received from one or more user devices (e.g., computing devices 502, 504, 506, 508, and 510) and/or from servers storing user data (e.g. server system 512). In some implementations, a user may consent to share data reflecting his or her own characteristics as well as data reflecting characteristics of other users in a social networking platform that the user has access to (e.g., because the user's user identity is connected to the other users' user identities in a social networking platform). For example, a user may install subgroup analysis application 550 on a mobile device 510 and in doing so consent to share user data to which the user has access through social network 523. In some implementations, the user data is received 602 by a network interface of server system (e.g., server system 514).

User characteristics may include information that has been manually inputted into a user identity in a social networking platform by a user through a graphical user interface (e.g., the graphical user interface of FIG. 3B). For example, a user may input information about his or her occupation, location or residence. User characteristics may also include information or metrics that are estimated based on other available user data for a user. For example, a user's 'influence" may be a metric that is determined based on a user's connections to and/or interactions with other users in a social networking platform. Received user data may be stored in a database or other data storage device (e.g., database 518 of server system 514).

User filter parameters are received 604. A set of users to be analyzed and a subset of those users may be identified by applying user filters to the user data. In some implementations, two user filters are received 604, one filter to identify 606 a set and another filter with additional parameters to identify 608 a subset of that set. In some implementations, only one filter is received which may be used to identify 606 a subset of the users. For example, the set may be chosen to include all users for which user data has been received and a single filter may be received that is used to identify a subset of the users. Filter parameters may correspond to various values or ranges of values for characteristics in the user data. For example, a gender filter parameter may specify male, female, or any, while an age filter parameter may specify one or more 5 year age ranges or allow any age.

The filter parameters may be input via a graphical user interface (e.g., filter pane 410 of graphical user interface 410). In some implementations, user filter parameters are received through a user interface (e.g., a keyboard, mouse, touchpad, or pointing device) of a computing device that is performing process 600 (e.g., server system 514 or mobile computing device 510). In some implementations, the filter may be input at a remote computing device (e.g., computing devices 502, 504, 506, 508, and 510) and received over a network through a network interface (e.g., a network interface of server system 514).

A set of users for analysis may be identified 606. In some implementations, the set is simply all users for which user data is available. In some implementations, the set is identified 606 from a larger superset of users by applying a user filter that filters the superset based on certain user characteristics. For example, the set may be limited to a particular user and all users that are connected with the particular user, i.e., all users with user identities that are connected to the particular user's user identity in a social networking platform. In some implementations, the set of users may be restricted to users who have installed or endorsed a particular application (e.g., a social networking application, or a mobile application). In some implementations, the set of users may be restricted to users who have endorsed at least one content item. The user filter may be applied by comparing characteristics of users in the superset to user filter parameters. If a user's characteristics match all the user filter parameters, the user may be identified as a member of the analysis set. In some implementations, the set of users is identified by the subgroup analysis module 540 in the server system 514.

A subset of users for analysis may be identified 608. The subset may be identified 608 from a larger set of users by applying a user filter that filters the larger set of users based on certain user characteristics. In some implementations, the user filter may be applied by comparing characteristics of users in the set to user filter parameters. In one particular example, the filter parameters may specify users who are female, between the ages of 30 and 34, and with a relationship status of married, while allowing any values for all other characteristics. All users in set meeting these criteria may be identified as members of the subset. In another example, the subset may be limited to a particular user and all users that are connected with the particular user. In some implementations, a user filter for identifying a subset may be combined with a user filter for identifying a set and the combined filter may be applied directly to a superset of users to identify the subset for analysis. In some implementations, the subset of users is identified by the subgroup analysis module 540 in the server system 514.

Content items of interest to users within the identified subset of users are identified 610. In some implementations, all content items that have been endorsed by at least one user in the subset are identified 610. In some implementations, the content items of interest are limited to content items with a relatively high rate of endorsement within the subset. For example, a percentage of users in the subset endorsing a content item may be determined by dividing a count of endorsements of the content item by users in the subset by the number of users in the subset. A percentage of users in the set endorsing the content item may be determined by dividing a count of endorsements of the content item by users in the set by the number of users in the set. The difference between these two percentages, or ratios, may then be determined and used to evaluate whether the content item has a relatively high rate of endorsement within the subset. In some implementations, at most a fixed number (e.g., 10 or 20) of content items are considered to be of interest and the content items, up to that fixed number, with the highest difference values are identified as content items of interest. In some implementations, all content items for which the difference is above a threshold (e.g., 15% or 30%) are identified as content items of interest. In some implementations, the content items of interest are identified by the subgroup analysis module 540 in the server system 514.

A check 612 is performed to determine whether additional content items of interest remain to be evaluated. For each of the content items identified as being of interest, a score is determined 614 based on a count of users in the subset that have endorsed the content item and based on a count of users in the larger set that have endorsed the content item. The score for a content item may reflect the level of interest for the content item of users in the subset relative to the level of interest for the content item in the broader set of users being analyzed. Content items in which the subset of users has a specialized interest may have high scores (e.g., scores that are a statistically significant amount higher than average scores for content items of interest or content items endorsed by users in the subgroup). For example, the score for a content item may be the ratio of the percentage of users in the subset who have endorsed the content to the percentage of users in the larger set that have endorsed the content item. Example procedures for determining the score for a content item are described in relation to FIGS. 7A and 7B. In some implementations, the score for a content item may be a measure of the likelihood of users in the subset endorsing the content item relative to the likelihood of other users in the set endorsing the content item. In some implementations, the score for a content item is determined by the subgroup analysis module 540 in the server system 514.

When check 612 reveals that all of the identified content items of interest have been scored, one or more of the content items of interest are selected 616 based on the scores. In some implementations, the selection of content items is accomplished by ranking and/or sorting the content items of interest based on the scores. Some or all of the content items of interest may be arranged or selected for positions, based on the ranking, in a list or other display pattern for presentation to a user. For example, content items (e.g., pages in a social network) with the highest scores may be displayed at the top of a list (e.g., as shown in the special interest pane 430 of GUI 400).

In some implementations, a content item (e.g., an online advertisement) may be selected 616 for presentation to a user based in part on the score for the content item or the score for a content item of interest that is related to the selected content item. For example, a page hosted in a social networking platform may be associated with or maintained by a company that advertises for a product. If the page has a relatively high score or the highest score among content items of interest to the subset of users, an online advertisement for the product may be selected 616 for pairing with other content requested by a user in the subset, based in part on the score. In some implementations, a content item is selected by the subgroup analysis module 540 in the server system 514. Some implementations may facilitate targeting of marketing campaigns to interested users.

Figure 8:
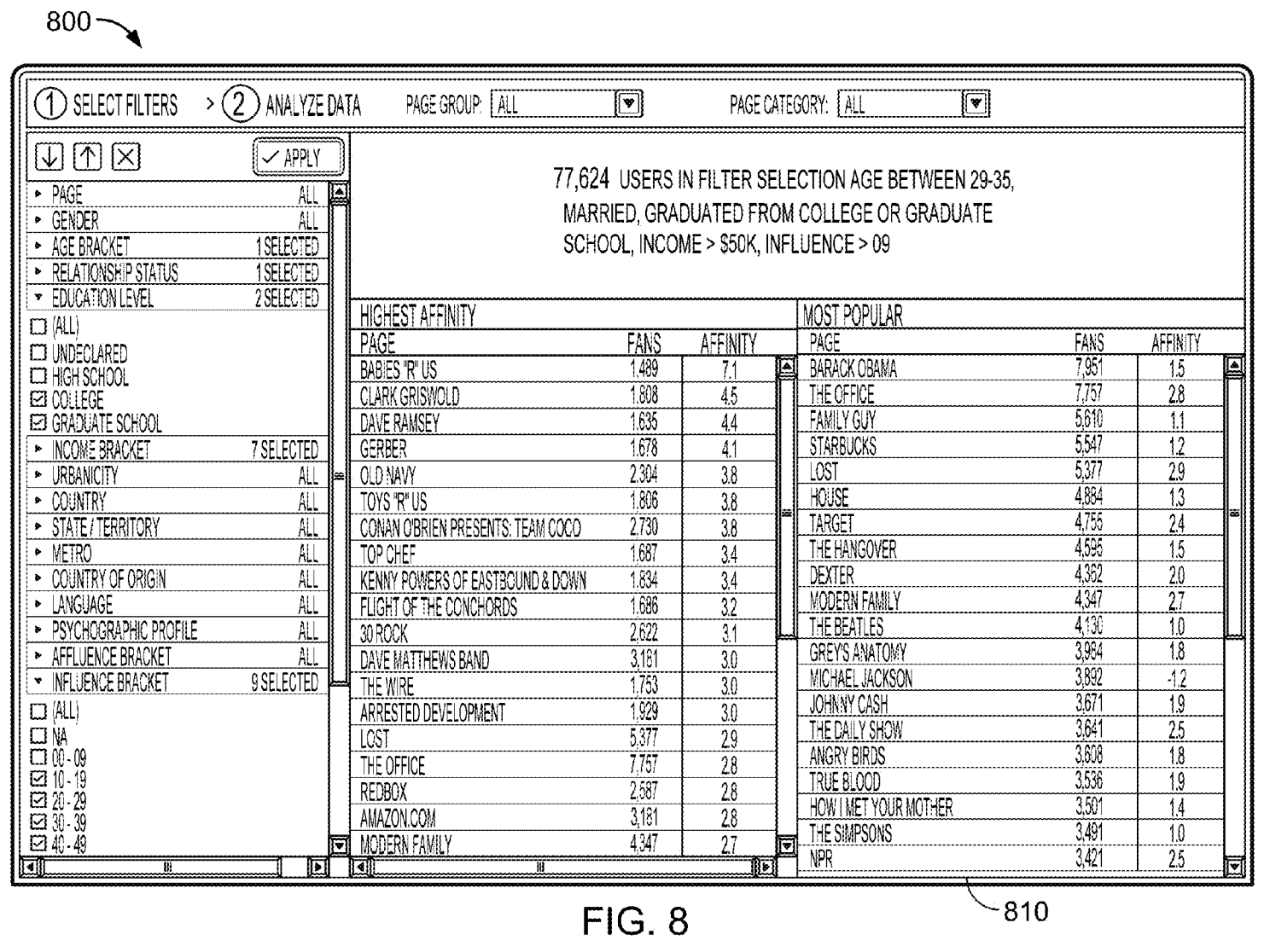

Data specifying the selected content items may be transmitted 618. The data specifying the selected content item(s) may encode a display for presentation to a user. The display may include a list of the selected content items sorted based on the scores (e.g., as shown in the special interest pane 430 of the graphical user interface 400). A display encoded by the transmitted data may also include an additional list of content items with the highest counts of endorsements from users in the subset. For example, as shown in FIG. 8, this may be referred to as a list of the most popular content items for users in the subset. In some implementations, the transmitted data specifies a selected content item that may itself be presented to a user. For example, the data may include the creative (i.e., the portion of an online advertisement that is displayed to a user) for an advertisement selected based on its relationship to a content item with a high score or the data may include a link to such an advertisement served by an advertisement server. In some cases, the data transmitted may specify one of the content items of interest that has been selected for presentation to a user in the subset based on the score for that content item.

In some implementations, the data specifying the selected content item(s) may be transmitted 618 from a server (e.g., server system 514) to a user computing device (e.g., computing devices 502, 504, 506, 508, and 510). In some implementations, the data specifying the selected content item(s) may be transmitted 618 via a network, using a network interface (e.g., a wireless network interface including an antenna).

Figure 7:
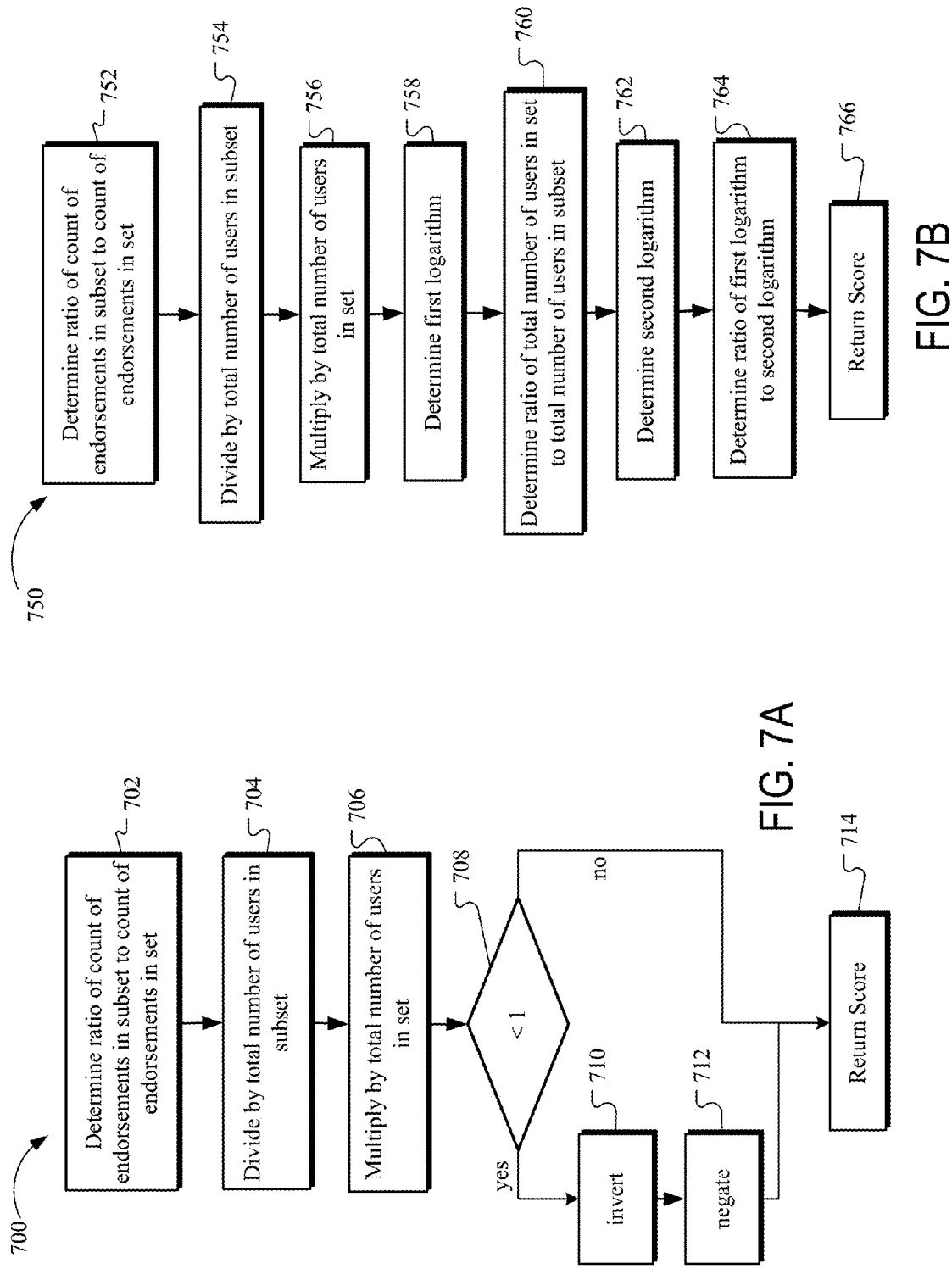
FIG. 7A-7B are flowcharts of example processes for determining a content item score reflecting subgroup interest.

FIG. 7A is a flowchart of an example process 700 for determining a score for a content item relative to a particular subset of users among a larger set of users based on a count of users in the subset that have endorsed the content item and based on a count of users in the larger set that have endorsed the content item. In this example, the score depends on a ratio of the percentage of users in the subset who have endorsed the content item to the percentage of users in the larger set that have endorsed the content item. This ratio is then converted for display as a negative number if the ratio is less than 1. First, a ratio is determined 702 of a count of endorsements for the content item by users in the subset to a count of endorsements for the content item by users in the larger set. The ratio may then be divided 704 the total number of users in the subset and multiplied 706 by the total number of users in the larger set. If 708 the result is less than one, then the result is inverted 710 (output=1/input) and negated 712 (output=−1*input) before the result is returned 714 as the score. A result that is negative may indicate that users in the subset are less interested in the content item than other users in the set. A result that is positive may indicate that users in the subset are more interested in the content item than other users in the set. Thus, scores determined by process 700 may more intuitively convey to a person reviewing scores for content items that certain content items are of less interest to users that are members of the subset relative to users in the larger set.

FIG. 7B is a flowchart of an example process 750 for determining a score for a content item relative to a particular subset of users among a larger set of users using logarithms based on a count of users in the subset that have endorsed the content item and based on a count of users in the larger set that have endorsed the content item. In this example, the score is determined from the user endorsement data for the content item in the set and subset according to equation (1):

$$\text{Score} = \log(E\_subset * N\_set/(E\_set * N\_subset))/\log(N\_set/N\_subset)$$

where E_subset is a count of users in the subset that have endorsed the content item, E_set is a count of users in the set that have endorsed the content item, N_subset is the total number of users in the subset, N_set is the total number of users in the set, and log( ) is a logarithm function.

First, a ratio is determined 752 of a count of endorsements for the content item by users in the subset to a count of endorsements for the content item by users in the larger set. The ratio may then be divided 754 by the total number of users in the subset and multiplied 756 by the total number of users in the larger set. A first logarithm of the result is determined 758. A ratio is determined 760 of the total number of users in the set to the total number of users in the subset and a second logarithm is determined 762 for this ratio. Finally, a ratio is determined 764 of the first logarithm to the second logarithm and the ratio is returned 766 as the score for the content item. Process 750 may provide scores that deemphasize content items with low overall interest levels that are subject to noisy measurements due to small sample size.

FIG. 8 depicts an example GUI 800. GUI 800 is similar to GUI 400 of FIGS. 4A-4B, but it includes an additional popular pages pane 810 on the right. The popular pages pane includes a sorted list of the pages that are endorsed by the most users in the subset. The list is ranked and sorted based on the displayed count of user endorsements in the subset (labeled "Fans"). For each of the pages in the list, a score (labeled "Affinity") is displayed that may be indicative the relative interest level in the page of users in the subset compared to the wider set of users. The "Affinity" scores may be determined using one or more of the methods described herein.

FIG. 9 shows an example of a generic computer device 900 and a generic mobile computing device 950, which may be used with techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit described and/or claimed implementations.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the implementations described and/or claimed. For example, techniques for gauging the interest (or disinterest) of a subset of a larger set of users in certain items relative to the interest in the same items by the larger set of users generally are described herein as being based on endorsements of content items by users in the subset of users and the larger set of users. However, these techniques are more generally applicable to gauging the strength of any interest (or disinterest) of a subset of a larger set of users relative to the strength of the same interest (or disinterest) of the larger set of users.

Furthermore, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method performed by a data processing apparatus, the method comprising:
   receiving data reflecting characteristics for users in a set of users, the characteristics for at least some of the users including indications of endorsements of content items by the users;
   receiving one or more parameters for a first user filter;
   identifying a subset of the set of users satisfying the one or more parameters of the first user filter by comparing the parameters of the first user filter to characteristics of users in the set;
   determining, for each of a plurality of content items that are endorsed by one or more users in the subset, a difference between a first count of users in the subset that have endorsed the content item divided by a total number of users in the subset and a second count of users in the set that have endorsed the content item divided by a total number of users in the set;
   identifying several content items based on the differences;
   for each of the several content items, determining a score for the content item based on a first count of users in the subset that have endorsed the content item and based on a second count of users in the set that have endorsed the content item;
   selecting one or more content items based on the scores; and
   transmitting data specifying the selected one or more content items.

2. The method of claim 1, wherein all users in the set are users of a social networking platform.

3. The method of claim 1, wherein the several content items are pages hosted by a social networking platform.

4. The method of claim 1, wherein the data specifying the selected one or more content items encodes a display for presentation to a user on a remote computing device, the display including a list of the selected one or more content items sorted based on one or more of the scores.

5. The method of claim 1, wherein scores are used to select a content item for presentation to a user in the subset.

6. The method of claim 5, wherein the content item selected for presentation is one of the several content items.

7. The method of claim 5, wherein the content item selected for presentation is related to one of the several content items.

8. The method of claim 1, further comprising:
   receiving one or more parameters for a second user filter; and
   identifying the set of users from a larger superset of users by comparing the one or more parameters of the second user filter to characteristics of each user in the superset.

9. The method of claim 8, wherein the one or more parameters of the second user filter require users in the set to be users of an application.

10. The method of claim 8, wherein the one or more parameters of the second user filter require users in the set to have endorsed at least one content item.

11. The method of claim 1, wherein receiving data reflecting characteristics for users in the set of users comprises receiving data from a first user including characteristics for the first user and characteristics for other users that are connected with the first user in a social network.

12. The method of claim 1, wherein determining the score for one of the several content items comprises determining a ratio of the first count times a total number of users in the set to the second count times a total number of users in the subset.

13. The method of claim 12, further comprising:
    checking if the ratio is less than one; and
    if the ratio is less than one, inverting and negating the ratio.

14. The method of claim 1, wherein identifying the several content items comprises selecting a fixed number of content items with the largest differences.

15. The method of claim 14, wherein identifying the several content items comprises selecting content items for which the differences are above a threshold.

16. The method of claim 1, wherein selecting the one or more content items comprises ranking the several content items based on the scores.

17. A system, comprising:
    one or more processing devices; and
    one or more non-transitory computer readable media storing instructions that are executable by the one or more processing device to perform operations comprising:
       receiving data reflecting characteristics for users in a set of users, the characteristics for at least some of the users including indications of endorsements of content items by the users;
       receiving one or more parameters for a first user filter;
       identifying a subset of the set of users satisfying the one or more parameters of the first user filter by comparing the parameters of the first user filter to characteristics of users in the set;
       determining, for each of a plurality of content items that are endorsed by one or more users in the subset, a difference between a first count of users in the subset that have endorsed the content item divided by a total number of users in the subset and a second count of users in the set that have endorsed the content item divided by a total number of users in the set;
       identifying several content items based on the differences;
       for each of the several content items, determining a score for the content item based on a first count of users in the subset that have endorsed the content item and based on a second count of users in the set that have endorsed the content item;
       selecting one or more content items based on the scores; and
       transmitting data specifying the selected one or more content items.

18. A non-transitory computer readable medium storing instructions executable by a processing device that upon such execution cause the processing device to perform operations comprising:
    receiving data reflecting characteristics for users in a set of users, the characteristics comprising endorsements of content items;
    receiving one or more parameters for a first user filter;
    identifying a subset of the set of users satisfying the one or more parameters of the first user filter by comparing the one or more parameters of the first user filter to characteristics of users in the set;
    determining, for each of a plurality of content items that are endorsed by one or more users in the subset, a difference between a first count of users in the subset that have endorsed the content item divided by a total number of users in the subset and a second count of users in the set that have endorsed the content item divided by a total number of users in the set;

identifying several content items based on the differences;

for each of the several content items, determining a score for the content item based on a first count of users in the subset that have endorsed the content item and based on a second count of users in the set that have endorsed the content item;

selecting one or more content items based on the scores; and transmitting data specifying the selected content items.

19. A computer-implemented method performed by a data processing apparatus, the method comprising:

receiving data reflecting characteristics for users in a set of users, the characteristics for at least some of the users including indications of endorsements of content items by the users;

receiving one or more parameters for a first user filter;

identifying a subset of the set of users satisfying the one or more parameters of the first user filter by comparing the parameters of the first user filter to characteristics of users in the set;

for each of several content items, determining a score for the content item based on a first count of users in the subset that have endorsed the content item and based on a second count of users in the set that have endorsed the content item based on determining a first logarithm of a ratio of the first count multiplied by a total number of users in the set to the second count multiplied by a total number users in the subset, determining a second logarithm of a ratio of a total number of users in the set to a total number users in the subset, and determining a ratio of the first logarithm to the second logarithm;

selecting one or more content items based on the scores; and transmitting data specifying the selected one or more content items.

20. A system, comprising:

one or more processing devices; and one or more non-transitory computer readable media storing instructions that are executable by the one or more processing device to perform operations comprising:

receiving data reflecting characteristics for users in a set of users, the characteristics for at least some of the users including indications of endorsements of content items by the users;

receiving one or more parameters for a first user filter;

identifying a subset of the set of users satisfying the one or more parameters of the first user filter by comparing the parameters of the first user filter to characteristics of users in the set;

for each of several content items, determining a score for the content item based on a first count of users in the subset that have endorsed the content item and based on a second count of users in the set that have endorsed the content item based on determining a first logarithm of a ratio of the first count multiplied by a total number of users in the set to the second count multiplied by a total number users in the subset, determining a second logarithm of a ratio of a total number of users in the set to a total number users in the subset, and determining a ratio of the first logarithm to the second logarithm;

selecting one or more content items based on the scores; and transmitting data specifying the selected one or more content items.

21. One or more non-transitory computer readable media storing instructions that are executable by one or more processing device to perform operations comprising:

receiving data reflecting characteristics for users in a set of users, the characteristics for at least some of the users including indications of endorsements of content items by the users;

receiving one or more parameters for a first user filter;

identifying a subset of the set of users satisfying the one or more parameters of the first user filter by comparing the parameters of the first user filter to characteristics of users in the set;

for each of several content items, determining a score for the content item based on a first count of users in the subset that have endorsed the content item and based on a second count of users in the set that have endorsed the content item based on determining a first logarithm of a ratio of the first count multiplied by a total number of users in the set to the second count multiplied by a total number users in the subset, determining a second logarithm of a ratio of a total number of users in the set to a total number users in the subset, and determining a ratio of the first logarithm to the second logarithm;

selecting one or more content items based on the scores; and transmitting data specifying the selected one or more content items.

* * * * *